United States Patent
Hardy et al.

(10) Patent No.: US 10,756,902 B2
(45) Date of Patent: Aug. 25, 2020

(54) SYSTEM AND METHOD USING DISTRIBUTED BLOCKCHAIN DATABASE

(71) Applicant: DISH Network L.L.C., Englewood, CO (US)

(72) Inventors: Christofer Hardy, Cheyenne, WY (US); David Abraham, Cheyenne, WY (US)

(73) Assignee: DISH Network L.L.C., Englewood, CO (US)

( * ) Notice: Subject to any disclaimer, the term of this patent is extended or adjusted under 35 U.S.C. 154(b) by 412 days.

(21) Appl. No.: 15/856,939

(22) Filed: Dec. 28, 2017

(65) Prior Publication Data

US 2019/0207768 A1 Jul. 4, 2019

(51) Int. Cl.
| | |
|---|---|
| *H04L 9/00* | (2006.01) |
| *H04L 9/32* | (2006.01) |
| *H04L 29/06* | (2006.01) |
| *H04L 9/08* | (2006.01) |
| *H04L 9/06* | (2006.01) |

(52) U.S. Cl.
CPC .......... *H04L 9/3242* (2013.01); *H04L 9/0618* (2013.01); *H04L 9/0897* (2013.01); *H04L 63/0281* (2013.01); *H04L 63/0823* (2013.01); *H04L 63/0853* (2013.01); *H04L 63/123* (2013.01); *H04L 2209/38* (2013.01)

(58) Field of Classification Search
CPC .................................................... H04L 9/3242
See application file for complete search history.

(56) References Cited

PUBLICATIONS

ETSI EN 302 307-1, V1.4.1, "Digital Video Broadcasting (DVB); Second generation framing structure, channel coding and modulation systems for Broadcasting, Interactive Services, News Gathering and other broadband satellite applications; Part 1: DVB-S2," 2014, 80 pages.

ETSI EN 302 307-2, V1.1.1, Draft, "Digital Video Broadcasting (DVB); Second generation framing structure, channel coding and modulation systems for Broadcasting, Interactive Services, News Gathering and other broadband satellite applications; Part 2: DVB-S2 Extensions (DVB-S2X)," 2014, 139 pages.

*Primary Examiner* — Jeffrey Nickerson
*Assistant Examiner* — Syed M Ahsan
(74) *Attorney, Agent, or Firm* — Seed Intellectual Property Law Group LLP

(57) ABSTRACT

A content distribution system includes content receivers that provide a plurality of blockchain databases that store transaction records associated with subscriber requests for content, and a computer system that processes those transaction records and enables authorized content receivers to output requested content.

18 Claims, 9 Drawing Sheets

SYSTEM AND METHOD USING DISTRIBUTED BLOCKCHAIN DATABASE

BACKGROUND

Technical Field

The present disclosure relates to content distribution systems. More particularly, the present disclosure relates to content distribution systems including content receivers that provide a distributed blockchain database, and a computer system that processes transaction records stored in the blockchain database and enables the content receivers to output requested content.

Description of the Related Art

Digital content distributors have employed conditional access systems to protect content items from being viewed by individuals who have not paid, or have not agreed to pay, to view the content items. For example, digital television providers have employed conditional access systems to determine whether a particular subscriber is authorized to view a particular television show or channel. Conditional access systems used to protect digital content items require certain criteria to be met before granting access to the content items.

For example, according to a Digital Video Broadcasting (DVB) standard, conditional smart cards have been used with cable and satellite television set-top boxes that enable subscribers to order content on a pay-per-view basis. Subscribers often wait to request to view a pay-per-view event until shortly before the scheduled start time of the pay-per-view event. Accordingly, a television head-end system that processes those orders may receive a large volume of authorization requests in a short period of time. If the television head-end system receives the authorization requests at a faster rate than it can process, some of the requests may not be processed. If a subscriber's request is not processed, the subscriber is not able to view the pay-per-view event.

BRIEF SUMMARY

The present disclosure teaches a content distribution system including content receivers that provide a distributed blockchain database that securely stores transaction records associated with subscriber requests for content, and a computer system that processes those transaction records and enables the content receivers to output requested content. The architecture of the distributed blockchain database enables the computer system to process a greater number of requests in a relatively short period of time compared to conventional content distribution system.

A content distribution method may be summarized as including transmitting, by a computer system, a first record; receiving, by a first content receiver, the first record; storing, by the first content receiver, the first record in a first block of data of a first blockchain database; receiving, by the first content receiver, a second record that includes a cryptographic hash value that identifies a second content receiver and an identifier of a first content item; obtaining, by the first content receiver, a cryptographic hash value using the first record; storing, by the first content receiver, the second record in a second block of data of the first blockchain database, the second block of data including the cryptographic hash value obtained by the first content receiver using the first record; receiving, by the computer system, the first blockchain database from the first content receiver; obtaining, by the computer system, a cryptographic hash value using the first record; comparing, by the computer system, the cryptographic hash value obtained by the computer system using the first record to the cryptographic hash value included in the second block of first blockchain database; after determining, based on the comparing of the cryptographic hash value obtained by the computer system using the first record to the cryptographic hash value included in the second block of first blockchain database, that the cryptographic hash value obtained by the computer system using the first record matches the cryptographic hash value included in the second block of first blockchain database decrypting, by the computer system, the second record; obtaining, by the computer system, an address of the second content receiver using the cryptographic hash value included in the second record; and transmitting, by the computer system, a first message to the second content receiver, the first message including information that enables the second content receiver to descramble a signal that is based on the first content item identified in the second record, using the address of the second content receiver obtained using the cryptographic hash value included in the second record.

The content distribution may further include transmitting, by the computer system, a second message; and receiving, by the first content receiver, the second message; and in response to receiving the second message, deleting, by the first content receiver, the first blockchain database.

The content distribution method may further include receiving, by a third content receiver, the first record; storing, by the third content receiver, the first record in a first block of data of a second blockchain database; receiving, by the third content receiver, the second record that includes the cryptographic hash value that identifies the second content receiver and the identifier of the first content item; obtaining, by the third content receiver, a cryptographic hash value using the first record; storing, by the third content receiver, the second record in a second block of data of the second blockchain database, the second block of data including the cryptographic hash value obtained by the third content receiver using the first record; receiving, by the computer system, the second blockchain database from the first content receiver; comparing, by the computer system, the cryptographic hash value obtained by the computer system using the first record to the cryptographic hash value included in the second block of second blockchain database.

The content distribution method may further include receiving, by a third content receiver, the first record; storing, by the third content receiver, the first record in a first block of data of a second blockchain database; receiving, by the third content receiver, a third record that includes a cryptographic hash value that identifies a fourth content receiver and an identifier of a second content item; obtaining, by the third content receiver, a cryptographic hash value using the first record; storing, by the third content receiver, the second record in a second block of data of the second blockchain database, the second block of data including the cryptographic hash value obtained by the third content receiver using the first record; receiving, by the computer system, the second blockchain database from the third content receiver; comparing, by the computer system, the cryptographic hash value obtained by the computer system using the first record to the cryptographic hash value included in the second block of second blockchain database; after determining, based on the comparing of the cryptographic hash value obtained by the computer system using the first record to the cryptographic hash value included in the second block of second blockchain database, that the cryptographic hash value obtained by the computer system using the first record matches the cryptographic hash value included in the second block of second blockchain database decrypting, by the computer system, the third record; obtaining, by the computer system, an address of the fourth content receiver using the cryptographic hash value included in the third record; and transmitting, by the computer system, a second message to the fourth content receiver, the second message including information that enables the fourth content receiver to descramble a signal that is based on the second content item identified in the third record, using the address of the fourth content receiver obtained using the cryptographic hash value included in the third record.

The second record may include a cryptographic hash value that identifies a user of the second content receiver, and the method may further include obtaining, by the computer system, an identifier of the user of the second content receiver using the cryptographic hash value that identifies the user of the second content receiver included in the second record; obtaining, by the computer system, an identifier of the second content receiver using the cryptographic hash value that identifies the second content receiver included in the second record; and storing, by the computer system, a third record that includes the identifier of the user of the second content receiver, the identifier of the second content receiver, and the identifier of the first content item.

The content distribution method may further include receiving, by a third content receiver, the second record; transmitting, by the third content receiver, a second message to the first content receiver; receiving, by the first content receiver, the second message; in response to the receiving, by the first content receiver, of the second message, transmitting a third message to the third content receiver, the third message including a value indicating a state of the first blockchain database; receiving, by the third content receiver, the second message; and after the receiving, by the third content receiver, of the second message, transmitting, by the third content receiver, the second record to the first content receiver.

The content distribution method may further include transmitting, by the third content receiver, a fourth message to a fourth content receiver that provides a second blockchain database; transmitting, by the third content receiver, a fifth message to a fifth content receiver that provides a third blockchain database; receiving, by the third content receiver, a sixth message including a value indicating a state of the second blockchain database; receiving, by the third content receiver, a seventh message including a value indicating a state of the third first blockchain database; determining, by the third content receiver, whether more than a threshold number of the first blockchain database, second blockchain database, and third blockchain database are not in a locked state based on the third, sixth, and seventh messages; in response to determining that more than the threshold number of the first blockchain database, second blockchain database, and third blockchain database are not in the locked state transmitting, by the third content receiver, the second record to the fourth content receiver; and transmitting, by the third content receiver, the second record to the fifth content receiver, wherein the transmitting, by the third content receiver, of the second record to the first content receiver is in response to determining that more than the threshold number of the first blockchain database, second blockchain database, and third blockchain database are not in the locked state.

The content distribution method may further include receiving, by the second content receiver, a request for the first content item; in response to the receiving, by the second content receiver, of the request for the first content item obtaining, by the second content receiver, a cryptographic hash value that identifies a user of the second content receiver; obtaining, by the second content receiver, the cryptographic hash value that identifies the second content receiver; obtaining, by the second content receiver, the identifier of the second content item; generating, by the second content receiver, the second record, the second record including the cryptographic hash value that identifies the user of the second content receiver, the cryptographic hash value that identifies the second content receiver, and the identifier of the second content item; encrypting, by the second content receiver, the second record; and after the encrypting, by the second content receiver, of the second record, transmitting, by the second content receiver, the second record to the third content receiver.

The content distribution method may further include after the encrypting, by the second content receiver, of the second record, transmitting, by the second content receiver, the second record to a fourth content receiver that provides a second blockchain database.

The content distribution method may further include receiving, by the second content receiver, the first message including the information that enables the second content receiver to descramble the signal that is based on the first content item; descrambling, by the second content receiver, the signal that is based on the first content item; and outputting, by the second content receiver, a video signal including the first content item.

A content distribution system may be summarized as including a computer system including at least one first processor; and at least one first memory device storing at least one program that, when executed by the at least one first processor, causes the computer system to transmit a first record; and a first content receiver including at least one second processor; and at least one second memory device storing at least one program that, when executed by the at least one second processor, causes the first content receiver to receive the first record; store the first record in a first block of data of a first blockchain database; receive a second record that includes a cryptographic hash value that identifies a second content receiver and an identifier of a first content item; obtain a cryptographic hash value using the first record; and store the second record in a second block of data of the first blockchain database, the second block of data including the cryptographic hash value obtained by the first content receiver using the first record, wherein the at least one program stored by the at least one first memory device, when executed by the at least one first processor, causes the computer system to receive the first blockchain database from the first content receiver; obtain a cryptographic hash value using the first record; compare the cryptographic hash value obtained by the computer system using the first record to the cryptographic hash value included in the second block of first blockchain database; after the cryptographic hash value obtained using the first record is compared to the cryptographic hash value included in the second block of first blockchain database, determine that the cryptographic hash value obtained using the first record matches the cryptographic hash value included in the second block of first blockchain database; in response to determining that the cryptographic hash value obtained using the first record matches the cryptographic hash value included in the second block of first blockchain database decrypt the second record; obtain an address of the second content receiver using the cryptographic hash value included in the second record; and transmit a first message to the second content receiver, the first message including information that enables the second content receiver to descramble a signal that is based on the first content item identified in the second record, using the address of the second content receiver obtained using the cryptographic hash value included in the second record.

The at least one program stored by the at least one first memory device, when executed by the at least one first processor, may cause the computer system to transmit a second message; and wherein the at least one program stored by the at least one second memory device, when executed by the at least one second processor, cause the first content receiver to receive the second message; and in response to receiving the second message, delete the first blockchain database.

The content distribution system may further include a third content receiver including at least one third processor; and at least one third memory device storing at least one program that, when executed by the at least one third processor, causes the third content receiver to receive the first record; store the first record in a first block of data of a second blockchain database; receive the second record that includes the cryptographic hash value that identifies the second content receiver and the identifier of the first content item; obtain a cryptographic hash value using the first record; and store the second record in a second block of data of the second blockchain database, the second block of data including the cryptographic hash value obtained using the first record, wherein the at least one program stored by the at least one first memory device, when executed by the at least one first processor, causes the computer system to receive the second blockchain database from the first content receiver; and compare the cryptographic hash value obtained using the first record to the cryptographic hash value included in the second block of second blockchain database.

The content distribution system may further include a third content receiver including at least one third processor; and at least one third memory device storing at least one program that, when executed by the at least one third processor, causes the third content receiver to receive the first record; store the first record in a first block of data of a second blockchain database; receive a third record that includes a cryptographic hash value that identifies a fourth content receiver and an identifier of a second content item; obtain a cryptographic hash value using the first record; and store the second record in a second block of data of the second blockchain database, the second block of data including the cryptographic hash value obtained using the first record, wherein the at least one program stored by the at least one first memory device, when executed by the at least one first processor, causes the computer system to receive the second blockchain database from the third content receiver; compare the cryptographic hash value obtained using the first record to the cryptographic hash value included in the second block of second blockchain database; after the cryptographic hash value obtained using the first record is compared to the cryptographic hash value included in the second block of second blockchain database, determine that the cryptographic hash value obtained using the first record matches the cryptographic hash value included in the second block of second blockchain database; in response to determining that the cryptographic hash value obtained using the first record matches the cryptographic hash value included in the second block of second blockchain database decrypt the third record; obtain an address of the fourth content receiver using the cryptographic hash value included in the third record; and transmit a second message to the fourth content receiver, the second message including information that enables the fourth content receiver to descramble a signal that is based on the second content item identified in the third record, using the address of the fourth content receiver obtained using the cryptographic hash value included in the third record.

The second record may include a cryptographic hash value that identifies a user of the second content receiver, and the at least one program stored by the at least one first memory device, when executed by the at least one first processor, may cause the computer system to obtain an identifier of the user of the second content receiver using the cryptographic hash value that identifies the user of the second content receiver included in the second record; obtain an identifier of the second content receiver using the cryptographic hash value that identifies the second content receiver included in the second record; and store a third record that includes the identifier of the user of the second content receiver, the identifier of the second content receiver, and the identifier of the first content item. The at least one program stored by the at least one third memory device, when executed by the at least one third processor, may cause the third content receiver to receive the second record; transmit a second message to the first content receiver; receive a third message including a value indicating a state of the first blockchain database from the first content receiver, in response to transmitting the second message to the first content receiver; and in response to receiving the third message including the value indicating the state of the first blockchain database from the first content receiver, transmit the second record to the first content receiver.

The at least one program stored by the at least one third memory device, when executed by the at least one third processor, may cause the third content receiver to transmit a fourth message to a fourth content receiver that provides a second blockchain database; transmit a fifth message to a fifth content receiver that provides a third blockchain database; receive a sixth message including a value indicating a state of the second blockchain database; receive a seventh message including a value indicating a state of the third first blockchain database; determine whether more than a threshold number of the first blockchain database, second blockchain database, and third blockchain database are not in a locked state based on the third, sixth, and seventh messages; in response to determining that more than the threshold number of the first blockchain database, second blockchain database, and third blockchain database are not in the locked state transmit the second record to the fourth content receiver; and transmit the second record to the fifth content receiver, wherein the third content receiver transmits the second record to the first content receiver in response to determining that more than the threshold number of the first blockchain database, second blockchain database, and third blockchain database are not in the locked state.

The second content receiver may include at least one fourth processor; and at least one fourth memory device storing at least one program that, when executed by the at least one fourth processor, causes the second content receiver to receive a request for the first content item; in response to receiving the request for the first content item obtain a cryptographic hash value that identifies a user of the second content receiver; obtain the cryptographic hash value that identifies the second content receiver; obtain the identifier of the second content item; generate the second record, the second record including the cryptographic hash value that identifies the user of the second content receiver, the cryptographic hash value that identifies the second content receiver, and the identifier of the second content item; encrypt the second record using; and after the second record is encrypted, transmit the second record to the third content receiver. The at least one program stored in the at least one fourth memory device, when executed by the at least one fourth processor, may cause the second content receiver to after the second record is encrypted, transmit the second record to a fourth content receiver that provides a second blockchain database. The at least one program stored in the at least one fourth memory device, when executed by the at least one fourth processor, may cause the second content receiver to receive the first message including the information that enables the second content receiver to descramble the signal that is based on the first content item; descramble the signal that is based on the first content item; and output a video signal including the first content item.

DETAILED DESCRIPTION

Figure 1:
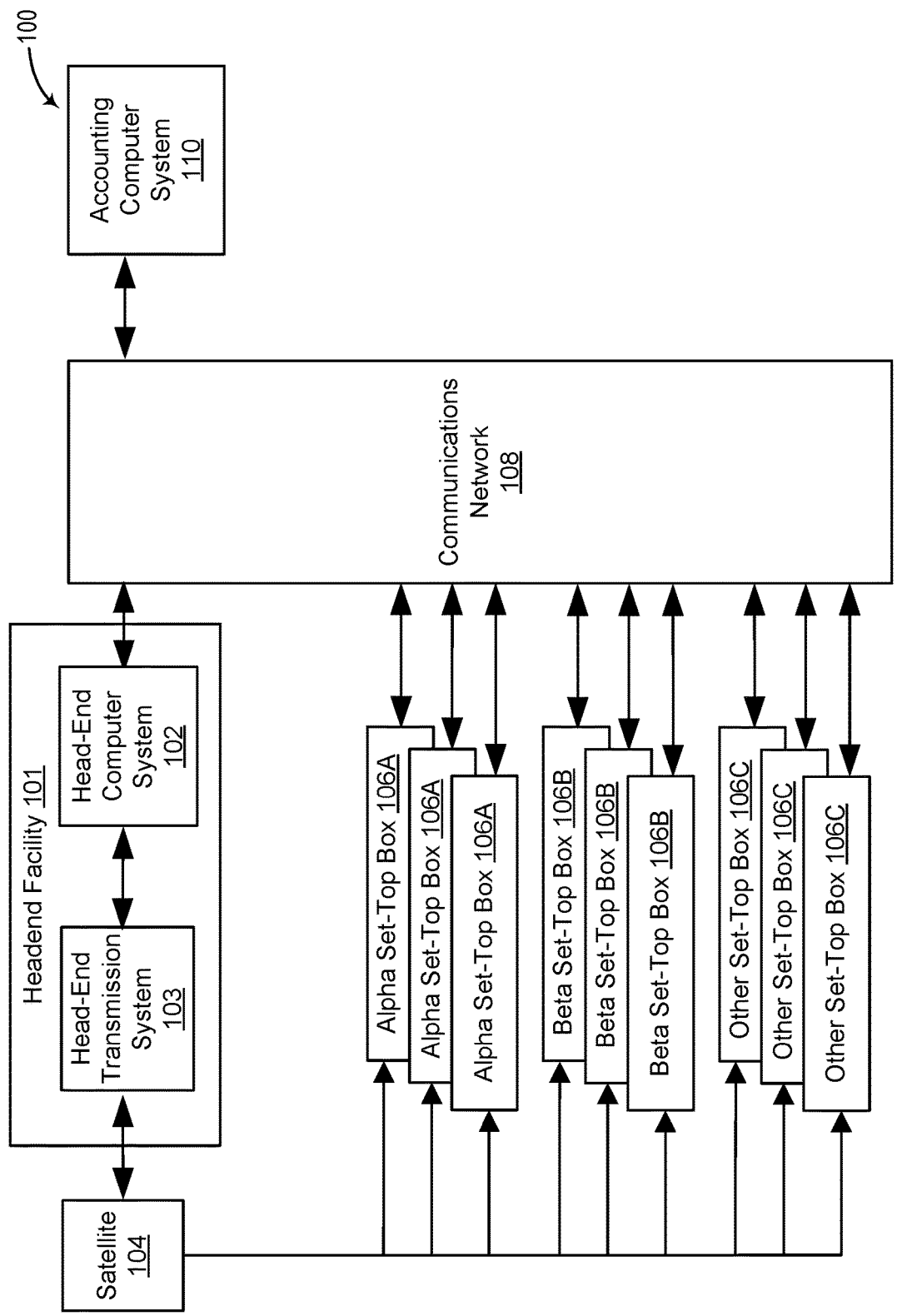
FIG. 1 is a block diagram of a content distribution system, according to one or more embodiments of the present disclosure.

FIG. 1 is a block diagram of a content distribution system 100, according to one or more embodiments of the present disclosure. The content distribution system 100 includes a head-end facility 101, which includes a head-end computer system 102 and a head-end transmission system 103, and a plurality of satellites 104 (only one shown in FIG. 1). The head-end computer system 102 will be described in detail below. The head-end transmission system 103 includes conventional digital broadcast equipment including network equipment through which content is received from content providers, digital encoders and modulators, high-power amplifiers, and antennas that transmit signals including the content and control information to the satellites 104. A discussion of the head-end transmission system 103 is omitted for the sake of brevity.

The content distribution system 100 also includes a plurality of alpha set-top boxes 106A, a plurality of beta set-top boxes 106B, a plurality of other set-top boxes 106C, a communications network 108, and an accounting computer system 110. It is noted that the content distribution system 100 includes additional components that are not shown in FIG. 1 to simplify the description of the content distribution system 100. For example, although not shown in FIG. 1, an antenna 105 (shown in FIG. 3) is coupled to each of the alpha set-top boxes 106A, beta set-top boxes 106B, and other set-top boxes 106C. One or more of the antennas 105 is a Model No. 1000.2 parabolic dish antenna available from DISH Network with headquarters in Englewood, Colo., for example.

Each of the set-top boxes 106A, beta set-top boxes 106B, and other set-top boxes 106C will be referred to herein a set-top box 106, unless the particular type of set-top box is relevant. An example of the structure of a set-top box 106 will be described in detail below with reference to FIG. 2.

As will be appreciated by those of ordinary skill in the art, head-end computer system 102, head-end transmission system 103, and set-boxes 106 operate in accordance with multiple standards, such as a Digital Video Broadcasting (DVB) standard, under which conditional access system (CAS) standards are defined in specification documents for conditional access (DVB-CA), a common scrambling algorithm (DVB-CSA), and a common interface (DVB-CI). These standards define a method by which digital-television streams are obfuscated such that only set-top boxes 106 with valid decryption smart cards can obtain access to the digital-television streams.

For example, the head-end computer system 102, head-end transmission system 103, and set-top boxes 106 operate in accordance with standards from the European Standards Organization, including standard ETSI EN 302 307-1 V1.4.1 (2014 November), entitled "Digital Video Broadcasting (DVB); Second generation framing structure, channel coding and modulation systems for Broadcasting, Interactive Services, News Gathering and other broadband satellite applications; Part 1: DVB-S2"; and draft standard ETSI EN 302 307-2 V1.1.1 (2014 October), entitled "Digital Video Broadcasting (DVB); Second generation framing structure, channel coding and modulation systems for Broadcasting, Interactive Services, News Gathering and other broadband satellite applications; Part 2: DVB-S2 Extensions (DVB-S2X)", which are hereby incorporated by reference in their entirety.

The head-end transmission system 103 receives content from content providers (e.g., television networks, pay per view event distributers, etc.), scrambles the content in accordance with a conditional access standard (e.g., DVB-S2), and provides the content to the satellites 104. The satellites 104 transmit signals encoded with the scrambled content and control information used to descramble the content. The signals transmitted by the satellites 104 are received by the antennas 105, which may include low-noise amplifiers that output the resulting amplified signals to the set-top boxes 106. Smart cards coupled to the set-top boxes 106 use secret keys or control words, to de-scramble the scrambled content. The control words are changed periodically (e.g., every 20 seconds) to prevent unauthorized access to the content.

The head-end computer system 102 instructs the head-end transmission system 103 to transmit messages that include control information to the set-top boxes 106 via the satellites 104. For example, the head-end computer system 102 instructs the head-end transmission system 103 to transmit entitlement control messages (ECMs) that contain encrypted control words. The set-top boxes 106 can decrypt a control word only when authorized to do so. The head-end computer system 102 authorizes a particular set-top box 106 to decrypt a particular control word by instructing the head-end transmission system 103 to transmit an entitlement management messages (EMMs) to set-top box 106. The EMMs are specific to each subscriber of the content distribution system 100, and identify the smart card in the subscriber's set-top box 106. The EMMs may be transmitted to the set-top boxes 106 periodically (e.g., monthly) via the satellites 104, which enable subscribers to view the content that is included in their respective subscription plans with the content distribution system 100. In addition, subscribers are able to view additional content that is not included in their respective subscription plans on a pay-per-view (PPV) basis.

For example, a subscriber may order a PPV event by using a remote control to cause a set-top box 106 to output a video signal to a display device, which causes the display device to display a menu for ordering PPV events. The subscriber can then use the remote control to select a particular PPV event and then to confirm that the subscriber would like to purchase access to the PPV event. In response, the set-top box 106 transmits a message in which access to the PPV event is requested via the communications network 108. As will be explained below, after a corresponding transaction is recorded in a transaction ledger to ensure that the subscriber's account will be billed for the PPV event, the head-end computer system 102 transmits ECMs and an EMM to the set-top box 106, which enable the set-top box 106 to de-scramble a signal received from a satellite 104 and output a corresponding video signal to a display device coupled thereto, which causes the display device to display a video portion of the PPV event.

Prior to explaining the process by which a transaction record is recorded in the transaction ledger, the structure of the head-end computer system 102, set-top boxes 106, and the accounting computer system 110 will be described.

Figure 2:
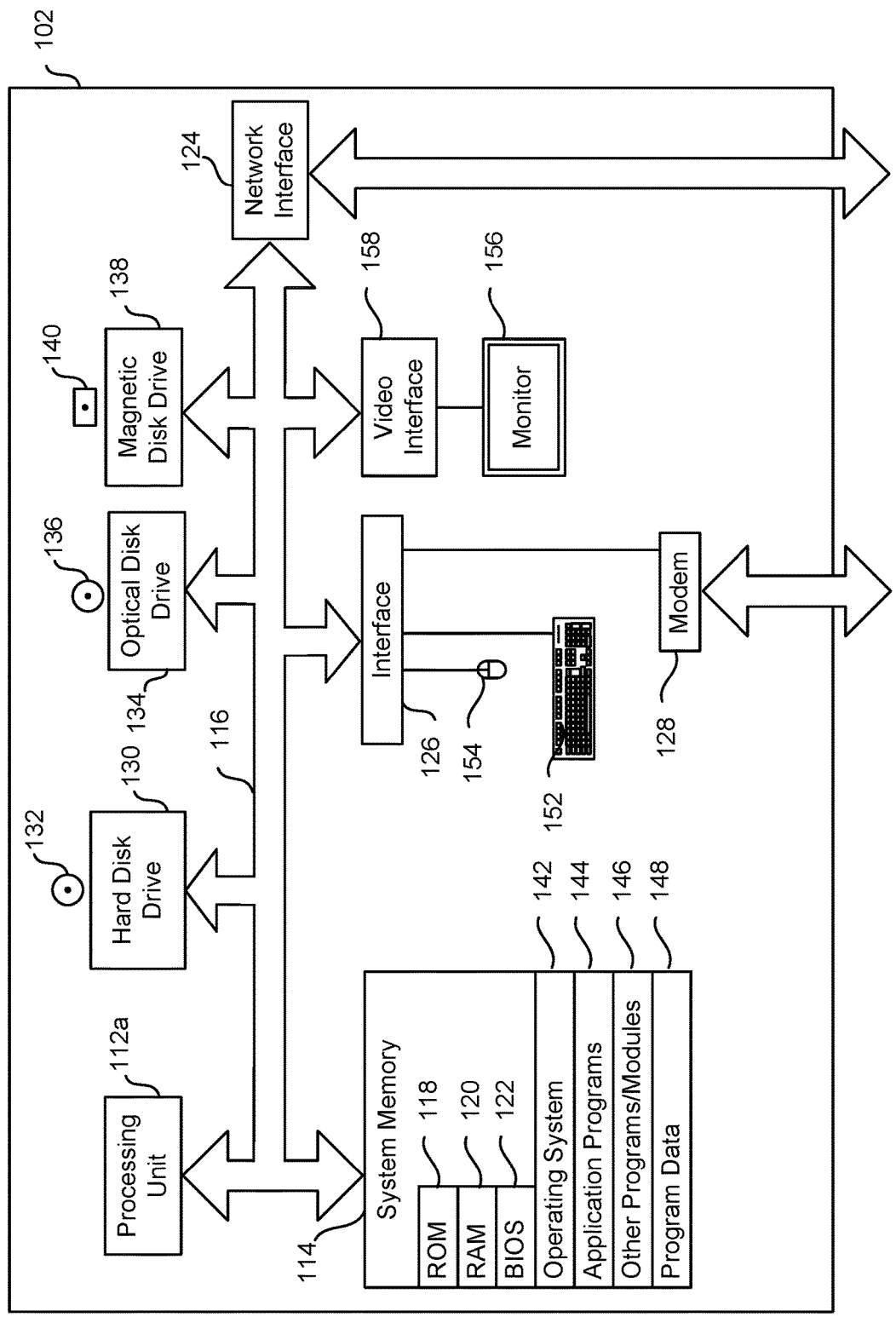
FIG. 2 is a block diagram of a head-end computer system, according to one or more embodiments of the present disclosure.

FIG. 2 is a block diagram of a head-end computer system 102, according to one or more embodiments of the present disclosure. The head-end computer system 102 is suitable for implementing systems, devices, and methods for providing access to content within the content distribution system 100. The head-end computer system 102 will at times be referred to in the singular herein, but this is not intended to limit the embodiments to a single device, since in typical embodiments, there may be more than one computer system or device involved. In one or more embodiments, the head-end computer system 102 is implemented as a plurality of servers that perform the functions described below. Unless described otherwise, the construction and operation of the various blocks shown in FIG. 2 are of conventional design. As a result, such blocks need not be described in further detail herein, as they will be understood by those skilled in the relevant art.

The head-end computer system 102 includes at least one processing unit 112, a system memory 114, and a system bus 116 that couples various system components including coupling the system memory 114 with the processing unit 112. The processing unit 112 may be any logic processing unit, such as one or more central processing units (CPUs), digital signal processors (DSPs), application-specific integrated circuits (ASICs), field programmable gate arrays (FPGAs), etc. The system bus 116 can employ any known bus structures or architectures, including a memory bus with memory controller, a peripheral bus, and a local bus. The system memory 114 includes read-only memory (ROM) 118 and random access memory (RAM) 120. A basic input/output system (BIOS) 122, which can form part of the ROM 118, contains basic routines that help transfer information between elements within the head-end computer system 102, such as during start-up.

The head-end computer system 102 may also include a plurality of interfaces such as network interface 124 and an interface 126 supporting modem 128 or any other wireless/wired interfaces.

The head-end computer system 102 may include a hard disk drive 130 for reading from and writing to a hard disk 132, an optical disk drive 134 for reading from and writing to a removable optical disk 136, and/or a magnetic disk drive 138 for reading from and writing to a magnetic disk 140. The optical disk 132 can be a CD-ROM, while the magnetic disk 134 can be a magnetic floppy disk or diskette. The hard disk drive 130, optical disk drive 134, and magnetic disk drive 138 may communicate with the processing unit 112 via the system bus 116. The hard disk drive 130, optical disk drive 134 and magnetic disk drive 138 may include interfaces or controllers (not shown) coupled between such drives and the system bus 116, as is known by those skilled in the relevant art. The drives 130, 134 and 138, and their associated computer-readable storage media 132, 136, 140, may provide non-volatile and non-transitory storage of computer-readable instructions, data structures, program modules and other data for the head-end computer system 102. Although the depicted head-end computer system 102 is illustrated employing a hard disk drive 130, optical disk drive 134, and magnetic disk drive 138, those skilled in the relevant art will appreciate that other types of computer-readable storage media that can store data accessible by a computer may be employed, such as magnetic cassettes, flash memory, smart cards, etc. For example, computer-readable storage media may include, but is not limited to, random access memory (RAM), read-only memory (ROM), electrically erasable programmable read-only memory (EEPROM), flash memory, compact disc ROM (CD-ROM), digital versatile disks (DVD) or other optical disk storage, magnetic cassettes, magnetic tape, magnetic disk storage or other magnetic storage devices, solid state memory or any other medium which can be used to store the desired information and which may be accessed by processing unit 112.

Program modules can be stored in the system memory 114, such as an operating system 142, one or more application programs 144, other programs or modules 140 and program data 148. Application programs 144 may include instructions that cause the processor(s) 112 to obtain or generate cryptographic data used to authenticate transaction records, read a distributed blockchain database, and generate information used to scramble and de-scramble content. Other program modules 140 may include instructions for handling security such as password or other access protection, communications encryption, and digital signature validation. The system memory 114 may also include communications programs, for example, for formatting entitlement management messages (EMM) and entitlement control message (ECM). In addition, the system memory 114 includes programs that cause the head-end computer system 102 to read blocks of information stored in a blockchain database provided by the set-top boxes 106, and to process transaction records contained in those blocks of information. For example, the programs can cause the head-end computer system 102 to authenticate transaction records, transfer authenticated transaction records to the accounting computer system, and to transmit messages to set-top boxes 106 of subscribers who have requested access to content, which enable the set-top boxes 106 to output requested content.

The application programs 144 may also include programs based on the Hyperledger project from the Linux Foundation modified to for the blockchain-based distributed database described herein. The application programs 144 may also include software from the Apache Software Foundation, load-balancing software from the NGINX Application Platform, and custom application programming interfaces (APIs) implemented in the Python, JavaScript, or Java programming languages, for example.

While shown in FIG. 2 as being stored in the system memory 114, the operating system 142, application programs 144, and other programs/modules 140, program data 148 can be stored on the hard disk 132 of the hard disk drive 130, the optical disk 132 of the optical disk drive 134 and/or the magnetic disk 134 of the magnetic disk drive 138.

An operator can enter commands and information into the head-end computer system 102 through input devices such as a touch screen or a keyboard 152 and/or a pointing device such as a mouse 154, and/or via a graphical user interface. Other input devices can include a microphone, joystick, game pad, tablet, scanner, etc. These and other input devices are connected to one or more of the processing units 112 through an interface 126 such as a serial port interface that couples to the system bus 116, although other interfaces such as a parallel port, a game port or a wireless interface or a universal serial bus (USB) can be used. A monitor 126 or other display device is coupled to the system bus 116 via a video interface 158, such as a video adapter. The head-end computer system 102 can include other devices, such as speakers, printers, etc.

The head-end computer system 102 can operate in a networked environment using logical connections to one or more remote computers and/or devices as described above with reference to FIG. 2. For example, the head-end computer system 102 can operate in a networked environment using logical connections to one or more satellite ground stations, mobile devices, landline telephones and other service providers or information servers. Communications may be via a wired and/or wireless network architecture, for instance wired and wireless enterprise-wide computer networks, intranets, extranets, telecommunications networks, cellular networks, paging networks, and other mobile networks. Notably, the head-end computer system 102 can communicate with the set-top boxes 106 using Internet Protocol (IP) standards (e.g., Transmission Control Protocol (TCP) and User Datagram Protocol (UDP).

It should be understood that the various techniques described herein may be implemented in connection with hardware, software and/or firmware or, where appropriate, with a combination of such. Thus, the methods and apparatuses of the disclosure, or certain aspects or portions thereof, may take the form of program code (i.e., instructions) embodied in tangible media, such as floppy diskettes, CD-ROMs, DVDs, hard drives, flash drives, or any other machine-readable or processor-readable storage medium wherein, when the program code is loaded into and executed by a machine, such as a processor of a computer or mobile device, the machine becomes an apparatus for practicing various embodiments. In the case of program code execution on programmable computers or mobile devices, such generally includes a processor, a storage medium readable by the processor (including volatile and non-volatile memory and/or storage elements), at least one input device, and at least one output device. One or more programs may implement or utilize the processes described in connection with the disclosure, e.g., through the use of an API, reusable controls, or the like. Such programs are preferably implemented in a high level procedural or object-oriented programming language to communicate with a computer system including the head-end computer system 102 depicted in FIG. 2. However, the program(s) can be implemented in assembly or machine language, if desired. In any case, the language may be a compiled or interpreted language, and combined with hardware implementations.

Figure 3:
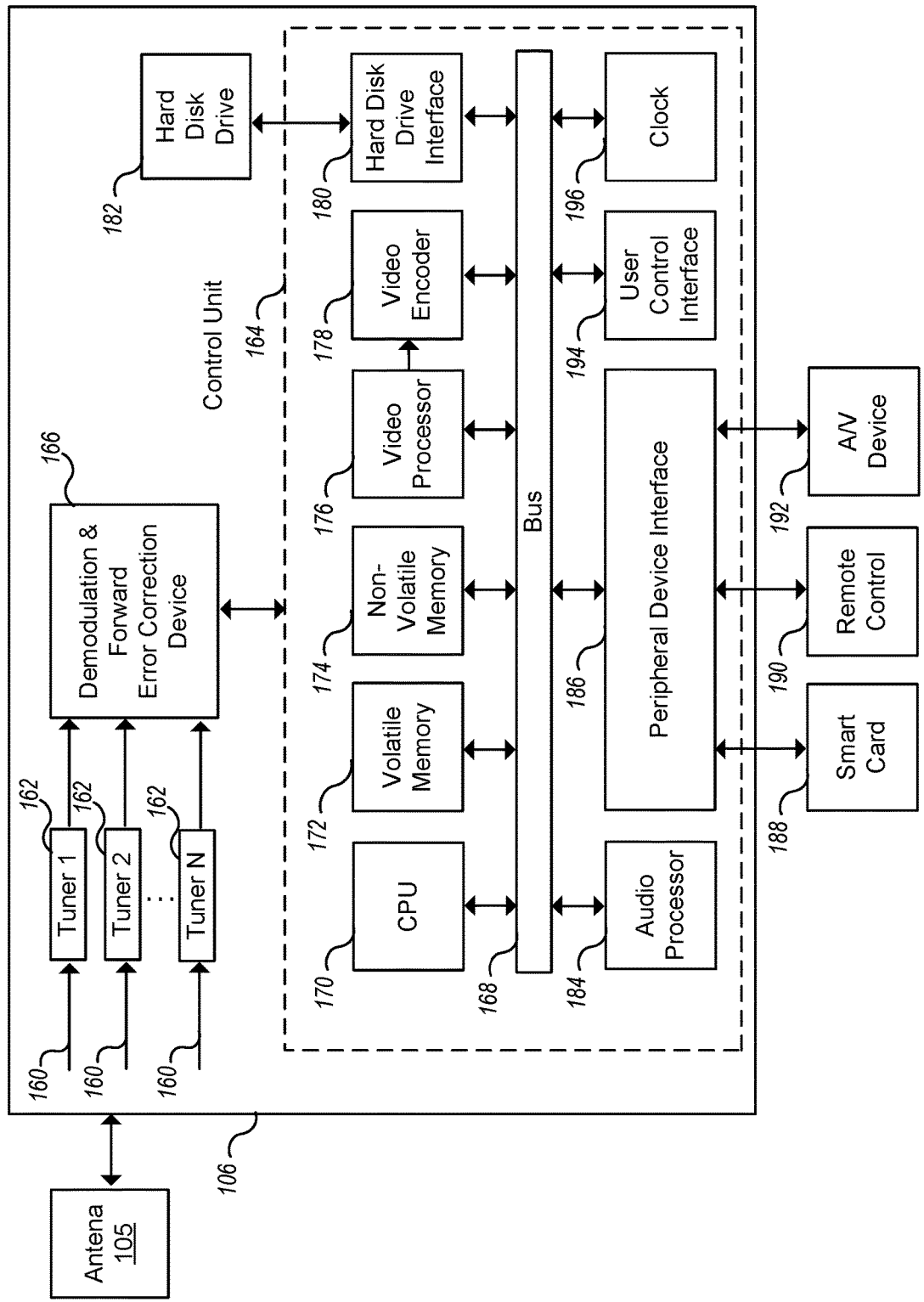
FIG. 3 is a block diagram of a set-top box, according to one or more embodiments of the present disclosure.

FIG. 3 is a block diagram of a content receiver or set-top box 106 according to one more embodiments of the present disclosure. The set-top box 106 may be a cable or satellite television converter device having DVR functionality, for example.

An antenna 105 inputs a signal 160 to the set-top box 106 (e.g., via a coaxial cable), which is typically processed prior to being output from the set-top box 106. The set-top box 106 may include one or more tuner devices 162, which may receive the signal 160 broadcast from the satellite 104 shown in FIG. 1, for example. The tuners 162 may receive commands in the form of signals from a control unit 164. Such commands may cause each of the tuners 162 to tune to a particular frequency band corresponding to a television channel that a subscriber would like to view on a peripheral device and/or would like to record in the set-top box 106.

Signals output from the tuners 162 are provided to a demodulation and forward error correction device 166. The signal 160 may be an analog or digital signal onto which data is modulated. The demodulation and forward error correction device 166 demodulates the signal 160 according to known modulation methods to recover the data. Such modulation methods may include amplitude modulation (AM) or frequency modulation (FM). If the data is transmitted in a digital format, the modulation methods may include bi-phase-shift keying (BPSK), quadrature phase-shift keying (QPSK), or eight-phase shift keying (8PSK), for example. The demodulation and forward error correction device 166 also may process the data according to known forward error correction (FEC) methods. Such methods may include inspecting parity bits included in the data.

Signals output from the demodulation and forward error correction device 166 are provided to the control unit 164. Various components of the control unit 164 may be included in one or more integrated circuits. The control unit 164 may operate under the control of a software program, firmware program, or some other program stored in memory or control logic. The control unit 164 may include fewer, more, or different components from those shown in FIG. 3 and described below.

The control unit 164 includes a shared bus 168 that communicatively couples at least one central processing unit (CPU) 170, a volatile memory 172, and a non-volatile memory 174. The non-volatile memory 174 may store control programs that are loaded into the volatile memory 172 and executed by the CPU 170. Additionally, the volatile memory 172 and/or the non-volatile memory 174 may store other data, such as electronic program guide (EPG) data.

The control unit 164 may include at least one video processor 176 that decodes and processes an encoded signal 160. The video processor 176 may include a graphics processor, a MPEG-2 decoder, and a display compositor with on-screen display (OSD) control for peripheral devices, for example. Also, the control unit 164 may include a video encoder 178 that may work in combination with the video processor 176 to encode a digital stream 118 for output to one or more peripheral devices, for example, a television. The video encoder 220 may translate a digital stream into a signal according to the NTSC, PAL, or SECAM standards.

The control unit 164 also may include at least one hard disk drive interface 180 and a hard disk drive 182. The hard disk drive interface 180 may provide a standard ATA/ATAPI interface or IDE/EIDE interface for transferring information to and from the hard disk drive 182. The hard disk drive 182 may store recorded programs, buffered data from a program being viewed, EPG data, an operating system, control programs, timers, transaction records, or other data. The hard drive 232 may be external and connected to the set-top box 106, for example, using a USB 2.0 or IEEE 1394 (FireWire) connection.

In addition, the control unit 164 may include an audio processor 184. The audio processor 184 may decode a digital stream for output to one or more peripheral devices, such as a stereo amplifier or a television. For example, the audio processor 184 may decode MPEG-1 layers I/II and layer m, Dolby Digital, Dolby ProLogic, SRS/TruSurround encoded audio data that is included in a digital stream.

The control unit 164 may be connected to one or more peripheral devices through a peripheral device interface 186. Such peripheral devices may include a smart card 188, which includes one or more processors, ROM, and RAM (not illustrated), a remote control 190, and an audiovisual device 192. The smart card 188 includes a memory that stores subscriber account information and security information. The control unit 164 provides a scrambled transport stream to the smart card 188, and a microprocessor within the smart cart 188 instructs a descrambler within to descramble the scrambled transport stream and to output the descrambled transport stream to the control unit 164 for further processing. The descrambler descrambles the transport stream using keys provided by the head-end computer system 102 to the set-top box 106.

The remote control 190 may wirelessly transmit signals to the set-top box 106 using UHF or IR communications. Such signals may indicate a television channel, which will cause the control unit 164 to change the frequency band to which one of the tuners 162 is tuned, process the signal output from that tuner 162, and provide the processed signal to a coaxial cable connector included in the peripheral device interface 186, which is connected to a coaxial cable that also is connected to the audiovisual device 192, for example. Although only one audiovisual device 192 is shown in FIG. 3, the peripheral device interface 186 may provide connections to more than one audiovisual device 192. The audiovisual device 192 may display graphical information corresponding to television programming content and/or user interface screens provided by the set-top box 106. Additionally, the audiovisual device 192 may output sounds corresponding to the television programming content or user interfaces.

The set-top box 106 may communicate with other peripheral devices via the peripheral device interface 186. Such peripheral devices may include a modem, a wireless communication device, and/or a wired communication device. For example, the set-top box 106 may utilize a wireless communication device that communicates via the network 108 to transmit transaction records used to order pay-per-view programming. In addition, the set-top box 106 may utilize a modem to receive EPG data using a standard telephone cable that is attached to the peripheral device interface 186 using a RJ-11 style connector. Also, the set-top box 106 may utilize the wired communication device to receive EPG data or software update data using an Ethernet cable that is attached to the peripheral device interface 186 using a RJ-45 style connector.

The control unit 164 may include a user control interface 194. The user control interface 194 may receive signals from buttons and/or a keypad of the set-top box 106. For example, a user may operate the keypad to power the set-top box 106 on and off, and to change the channel of the programming content that is being output from the peripheral device interface 186. In addition, the user control interface 194 receive signals from the remote control 190 that are used to select content that a user would like to order on a pay-per-view basis.

The set-top box 106 also may include a clock 196. The clock 196 outputs a signal indicative of the current date and time. For example, the CPU 170 may utilize the output from the clock 196 to determine whether to begin or to end recording of programming content. Additionally, the CPU 170 may utilize the output from the clock 196 to determine what television program is currently being broadcast on a particular channel. For example, the set-top box 106 may store EPG data or other scheduling information that includes unique identifiers of each the television program scheduled to be broadcast on each channel during a particular time period, which may include a start time, an end time, a title, a category, a type, and a textual description of each television program. The CPU 170 may use the output from the clock 196 and a channel identifier to determine the title or other unique identifier of the television program that is scheduled to be broadcast on a channel at the current time.

Figure 4:
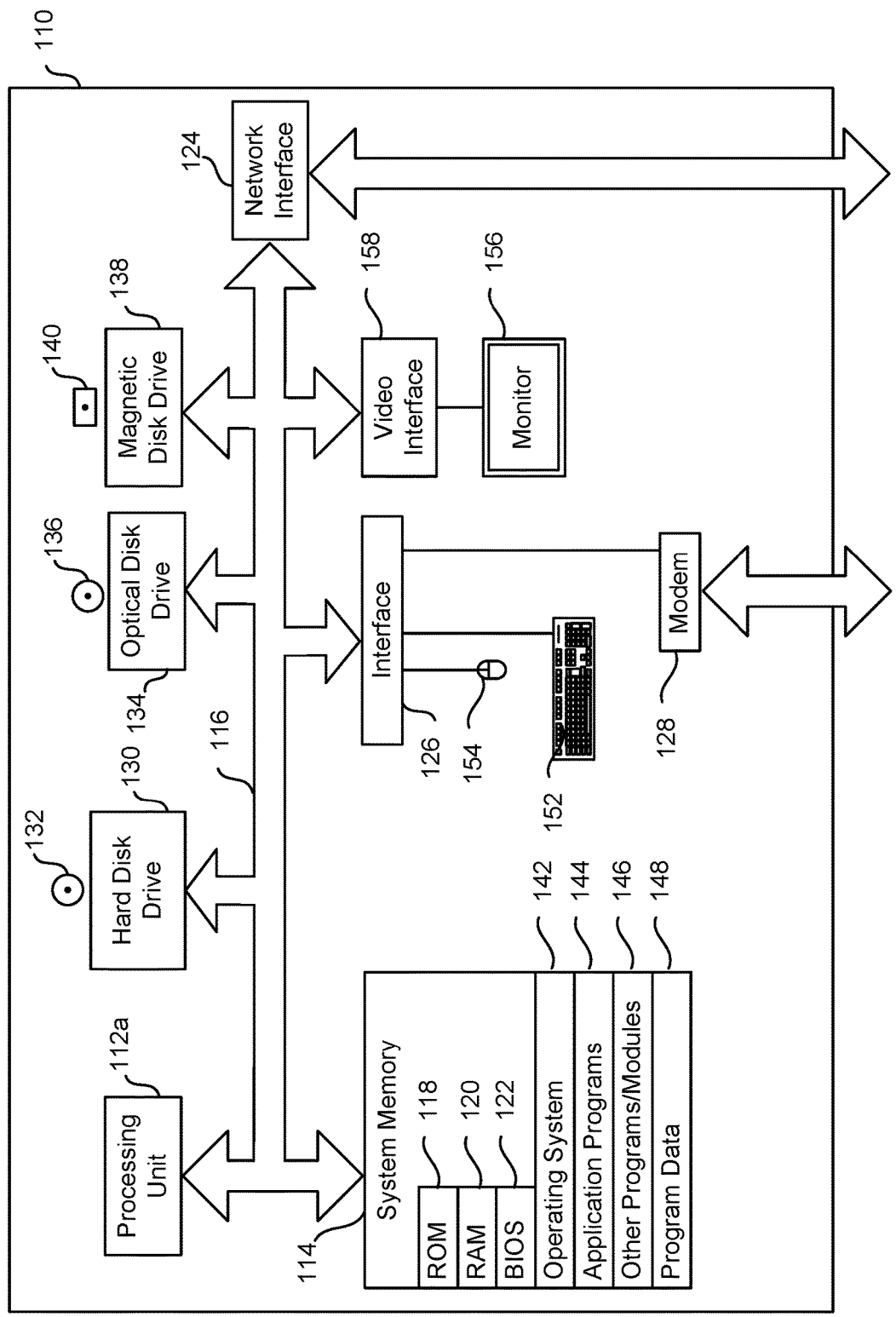
FIG. 4 is of an accounting computer system, according to one or more embodiments of the present disclosure.

FIG. 4 is a block diagram of an accounting computer system 110, according to one or more embodiments of the present disclosure. The accounting computer system 110 may include many of the same components as included in the head-end computer system 102, which will not be described again for the sake of brevity. The application programs 144 of the accounting computer system 110 stores programs that cause the accounting computer system 110 to provide a distributed database. For example, the application programs may include Mysql, MSSQL, Mongo, Cassandra or other rapid web database technologies. In addition, the application programs 144 of the accounting computer system 110 stores application programs that access transaction records stored in the distributed database and generate corresponding billing records for subscribers of the content distribution system 100.

Having described the structure of the head-end computer system 102, the set-top boxes 106, and the accounting computer system 110 an overview of the software architecture used in the content distribution system 100 will now be described. The software architecture is a layered architecture that includes three layers, as shown in Table 1.

TABLE 1

| Software Layer | Implemented by: |
| --- | --- |
| Processing Layer | Head-end computer system 102 |
| Ledger Layer | Alpha set-top boxes 106A |
| Transaction Layer | Beta set-top boxes 106B |

As shown in Table 1, a processing layer is implemented by the head-end computer system 102, a ledger layer is implemented by the alpha set-top boxes 106A, and a transaction layer is implemented by the beta set-top boxes 106B. The transaction layer is responsible for receiving transaction records from set-top boxes 106 that have generated the transaction records in response to subscribers placing orders for content items. The ledger layer is responsible for maintaining a distributed ledger by locking the ledger and writing to it. The processing layer is responsible for initializing the distributed ledger, reading the distributed ledger, merging the distributed ledger into a master ledger, ensuring that the subscribers are billed for transactions, and ensuring that authorized subscribers are given access to content that they have ordered. The processing layer is also responsible for causing the distributed ledger to be periodically deleted, and a new distributed ledger to be initialized.

The distributed ledger is a blockchain database that is replicated across the alpha set-top boxes 106A. The set-top boxes 106 use cryptography and digital signatures to prove the identity of each subscriber that places an order, and to ensure the authenticity of the transaction records. Because cryptography and digital signatures are used, it is hard to change the transaction records and it is easy to detect when someone has done so. The alpha set-top boxes 106A add each transaction to the distributed ledger in a block of data that includes a header with information about the block, a reference to the previous block, and a digital fingerprint or hash of the data contained in the block. The blocks are "chained" together based on the reference to the previous block included in the header of each block.

The head-end computer system 102 and the set-top boxes 106 cooperate to perform a process that includes three primary phases. The first phase of the process will be described with reference to FIGS. 5A and 5B. The second phase of the process will be described with reference to FIGS. 6-8. The third phase of the process will be described with reference to FIG. 5B.

Figure 5A:
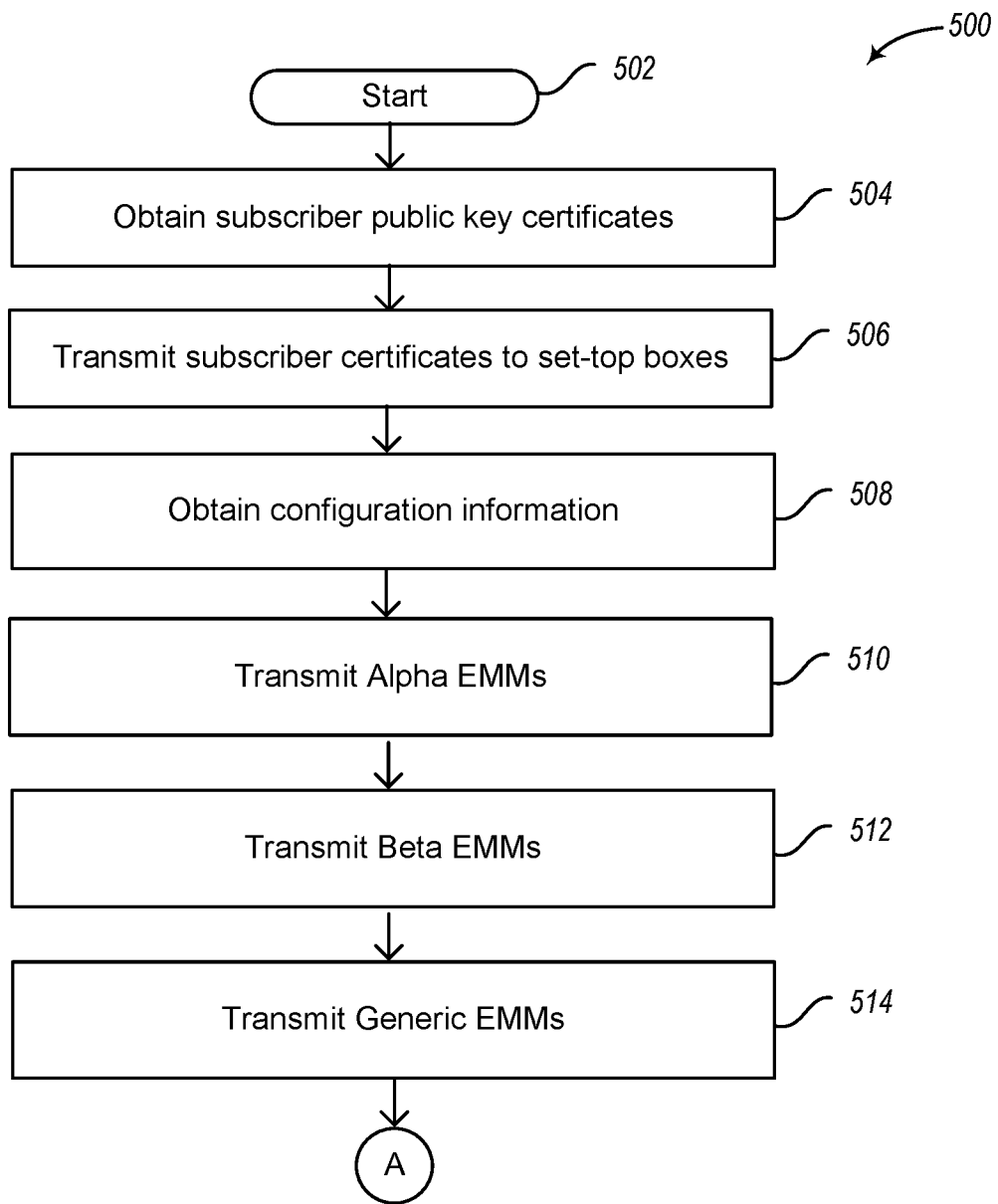
FIGS. 5A and 5B show a flowchart of a process performed by the head-end computer system, according to one or more embodiments of the present disclosure.

FIG. 5A shows a flowchart of a process 500 performed by the head-end computer system 102 in the first phase, according to one or more embodiments of the present disclosure. As set forth below, during the first phase, the head-end computer system 102 obtains or generates information used to configure the set-top boxes 106 and to initialize the distributed ledger. The process begins at 502.

At 504, the head-end computer system 102 obtains subscriber public key certificates. In one or more embodiments, the public key certificates are formatted according to the X.509 standard. The accounting computer system 110 may initially generate and store the subscriber public key certificates, and the head-end computer system 102 may receive the subscriber public key certificates from the accounting computer system 110. Alternatively, the head-end computer system 102 may generate the subscriber public key certificates.

At 506, the head-end computer system 102 transmits the subscriber public key certificates to respective set-top boxes 106. For example, the head-end computer system 102 causes the head-end transmission system 103 to transmit via the satellite 104 Certificate EMMs to the set-top-boxes 106, which may store the certificates in their respective smart cards 188.

At 508, the head-end computer system 102 obtains configuration information. For example, the head-end computer system 102 receives the configuration information from another computer system, such as the accounting computer system 110. Alternatively, the head-end computer system 102 generates the configuration information.

The configuration information may include one or more data structures that store information regarding each of the set-top boxes 106 that is to be configured as an alpha set-top box 106A, each of the set-top boxes 106 that is to be configured as a beta set-top box 106B, and each of the set-top boxes 106 that is to be configured as an other set-top box 106C. For example, the head-end computer system 102 stores a first file that includes a unique identifier (e.g., serial number) of and an address used by each of the set-top boxes 106 that is to be configured as an alpha set-top box 106A, a second file that includes a unique identifier of and an address used by each of the set-top boxes 106 that is to be configured as a beta set-top box 106B, and a third file that includes a unique identifier and an address of each of the set-top boxes 106 that is to be configured as an other set-top box 106C. The configuration information may include other information that is customized for each set-top box 106, as described below.

At 510, the head-end computer system 102 transmits an Alpha EMM to each set-top box 106 that is to be configured as an alpha set-top box 106A. Each set-top box 106 that receives an Alpha EMM responds by configuring itself as an alpha set-top box 106A. For example, the Alpha EMM may include an application identifier (e.g., file name) and each set-top box 106 that receives an Alpha EMM executes the application identified by the Alpha EMM. The Alpha EMM also may include the application and other information that is customized for each set-top box 106 that is to be configured as an alpha set-top box 106A.

At 512, the head-end computer system 102 transmits a Beta EMM to each set-top box 106 that is to be configured as a Beta set-top box 106B. Each set-top box 106 that receives a Beta EMM responds by configuring itself as a beta set-top box 106B. For example, the Beta EMM may include an application identifier (e.g., file name) and each set-top box 106 that receives a Beta EMM executes the application identified by the Beta EMM. The Beta EMM also may include the application and other information that is customized for each set-top box 106 that is to be configured as an alpha set-top box 106B. For example, the Beta EMM also may a data structure storing (e.g., Internet Protocol (IP) addresses of) all or a subset of the alpha set-top boxes 106A that a particular set-top box 106 which receives the Beta EMM should use when contacting alpha set-top boxes 106A to write a transaction record to the distributed ledger, as will be described below.

At 514, the head-end computer system 102 transmits a Generic EMM to each set-top box 106. Alternatively, the head-end computer system 102 may transmit a Generic EMM to each set-top box 106 that is not to be configured as an alpha set-top box 106B or a Beta set-top box 106B (i.e., other set-top boxes 106C). Each set-top box 106 that receives a Generic EMM responds by configuring itself in accordance with the Generic EMM. For example, the Generic EMM may include an application identifier (e.g., file name) and each set-top box 106 that receives a Generic EMM executes the application identified by the Generic EMM. The Generic EMM also may include the application and other information that is customized for each set-top box 106. For example, the Generic EMM also may a data structure storing addresses (e.g., IP addresses of) all or a subset of the beta set-top boxes 106B to use when contacting beta set-top boxes 106B to transfer a transaction record, as will be described below.

At 516, the head-end computer system 102 obtains an initial ledger transaction. The accounting computer system 110 may generate the initial ledger transaction, and the head-end computer system 102 may receive the initial ledger transaction from the accounting computer system 110. Alternatively, the head-end computer system 102 may generate the initial ledger transaction. The initial ledger transaction includes a generic nonuse transaction record, which is added to the distributed ledger as an initial block of the ledger. Initially, there must be at least one block in the ledger because the next block that is added to the ledger must refer to a previous block, as described below.

At 518, the head-end computer system 102 transmits an Initial Ledger EMM that includes the initial ledger transaction to each of the alpha set-top boxes 106A. Each set-top box 106 that receives an Initial Ledger EMM responds by writing the initial ledger transaction to a first block of data of its local blockchain database.

After the set-top boxes 106 have been configured and the initial ledger transaction has been written to the blockchain database, the second phase begins. During the second phase, some of the set-top boxes 106 receive subscriber requests for access to PPV content, generate corresponding transaction records, and transmit the transaction records to the beta set-top boxes 106B, which transmit them to the alpha set-top boxes 106C where they are added to the block-chain database, as described below with reference to FIGS. 6-8.

Figure 6:
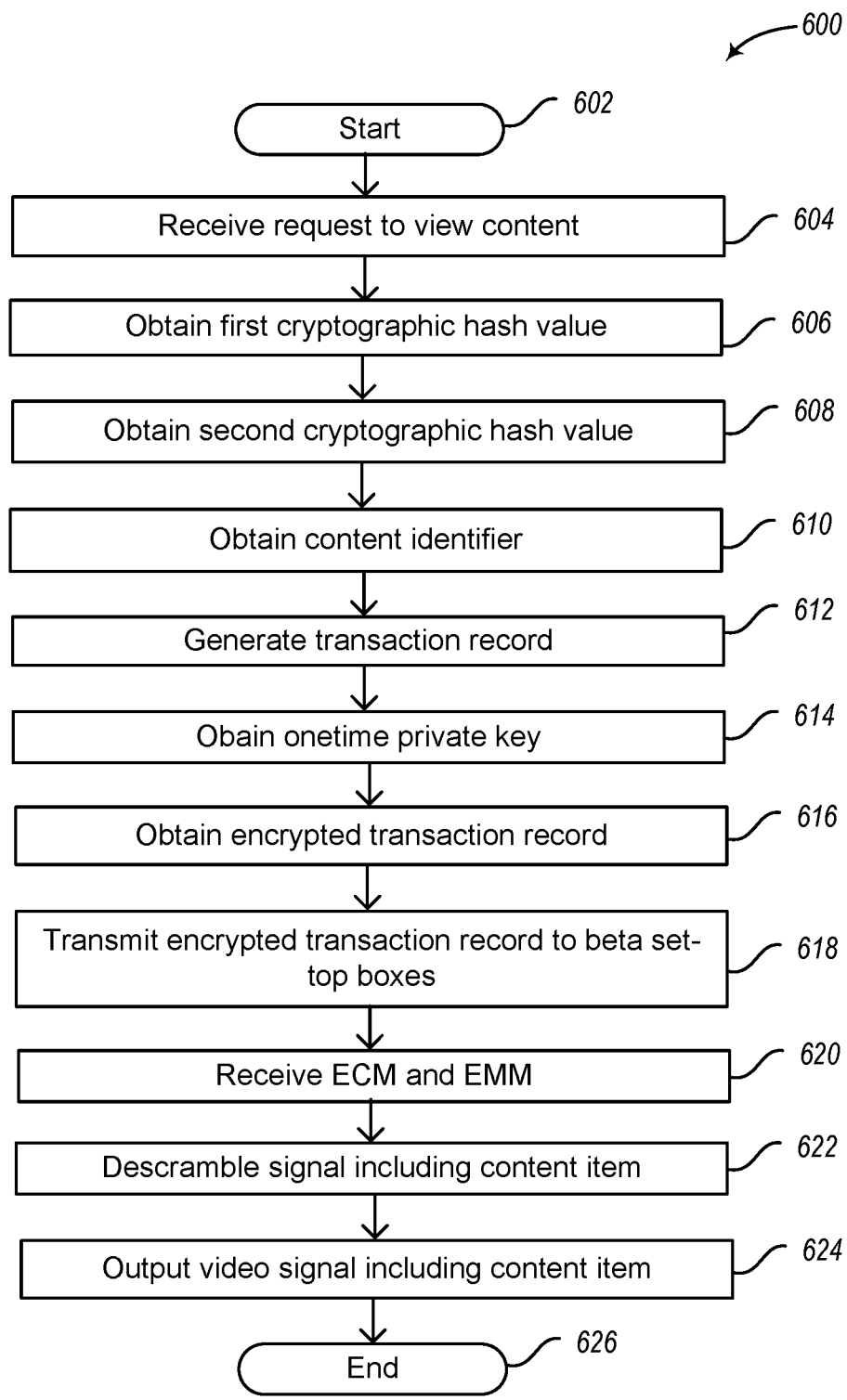
FIG. 6 shows a flowchart of a process that can be performed by any of the set-top boxes, according to one or more embodiments of the present disclosure.

FIG. 6 shows a flowchart of a process 600 that is performed by each of the set-top boxes 106 in response to receiving a request to view content, according to one or more embodiments of the present disclosure. The process 600 starts at 602.

At 604, a set-top-box 106 receives a request to view content. For example, a subscriber interacts with the user control interface 164 using the remote control 190 to order a pay-per-view event (e.g., a live boxing match). In response, the CPU 170 may receive a request to view content from the user control interface 164, for example.

At 606, the set-top box 106 obtains a first cryptographic hash value that uniquely identifies the subscriber account associated with the set-top box 106. The set-top box 106 generates the first cryptographic hash value by applying a secure hash algorithm to a unique identifier of the subscriber. For example, the set-top box 106 applies the SHA-256 algorithm, which is a member of the Secure Hash Algorithm (SHA) 2 cryptographic hash functions designed by the National Security Agency, to an account number or other information contained in a subscriber's public key certificate that is stored by the set-top box 106.

At 608, the set-top box 106 obtains a second cryptographic hash value that uniquely identifies the set-top box 106. The set-top box 106 generates the second cryptographic hash value by applying a secure hash algorithm to a unique identifier of the set-top box 106. For example, the set-top box 106 applies the SHA-256 algorithm to a serial number of the set-top box 106 or other information stored by the set-top box 106.

At 610, the set-top box 106 obtains a unique identifier of the content item that is being ordered. The unique identifier of the content may be included in EPG data stored by the set-top box 106. The unique identifier of the content item being ordered may be an item number that the head-end computer system 102 and/or the accounting computer system 110 associates with the content item.

At 612, the set-top box 106 generates a transaction record that includes the first cryptographic hash value obtained at 606, the second cryptographic hash value obtained at 608, and the unique identifier of the content item that is being ordered obtained at 610. For example, the set-top box 106 generates may create a file or other suitable data structure that includes the first cryptographic hash value, the second cryptographic hash value, and the unique identifier of the content item.

At 614, the set-top box 106 obtains a onetime private key. In one or more embodiments, the set-top box 106 generates the onetime private key using a conventional cryptographic key generation function. For example, the set-top box 106 obtains the onetime private key using information contained in the subscriber's public key certificate that is stored by the set-top box 106. Alternatively, the set-top box 106 may receive the onetime private key from the head-end computer system 102, for example.

At 616, the set-top box 106 obtains an encrypted transaction record by encrypting the transaction records generated at 612 using the onetime private key generated at 614 and a conventional private key encryption algorithm. The top box 106 also encrypts the onetime private key using a private key of the subscriber and a conventional public key encryption algorithm. The head-end computer system 102 stores a public key (or subkey) that corresponds to the private key. Accordingly, the head-end computer system 102 is able to decrypt the onetime private key using the public key (or subkey) and the public key encryption algorithm, and then is able to decrypt the transaction record using the decrypted onetime private key and the private key encryption algorithm.

At 618, the set-top box 106 transmits the encrypted transaction record and the encrypted onetime private key obtained at 616 to the beta set-top boxes 106B. In one or more embodiments, the top box 106 transmits the transaction record using each address included in a list of addresses (e.g., IP addresses) of beta set-top boxes 106B that it received from the head-end computer system 102.

At 620, the set-top box 106 receives at least one message (e.g. ECM, EMM) from the head-end computer system 102, the at least one message contains information (e.g., at least one key) that enables the set-top box 106 to descramble a signal that includes the content item.

At 622, the set-top box 106 descrambles the signal that includes the content item using the information (e.g., at least one key) the at least one message received at 620.

At 624, the set-top box 106 outputs a video signal that includes the content item to the audiovisual device 192. The method 600 ends at 626.

Figure 7:
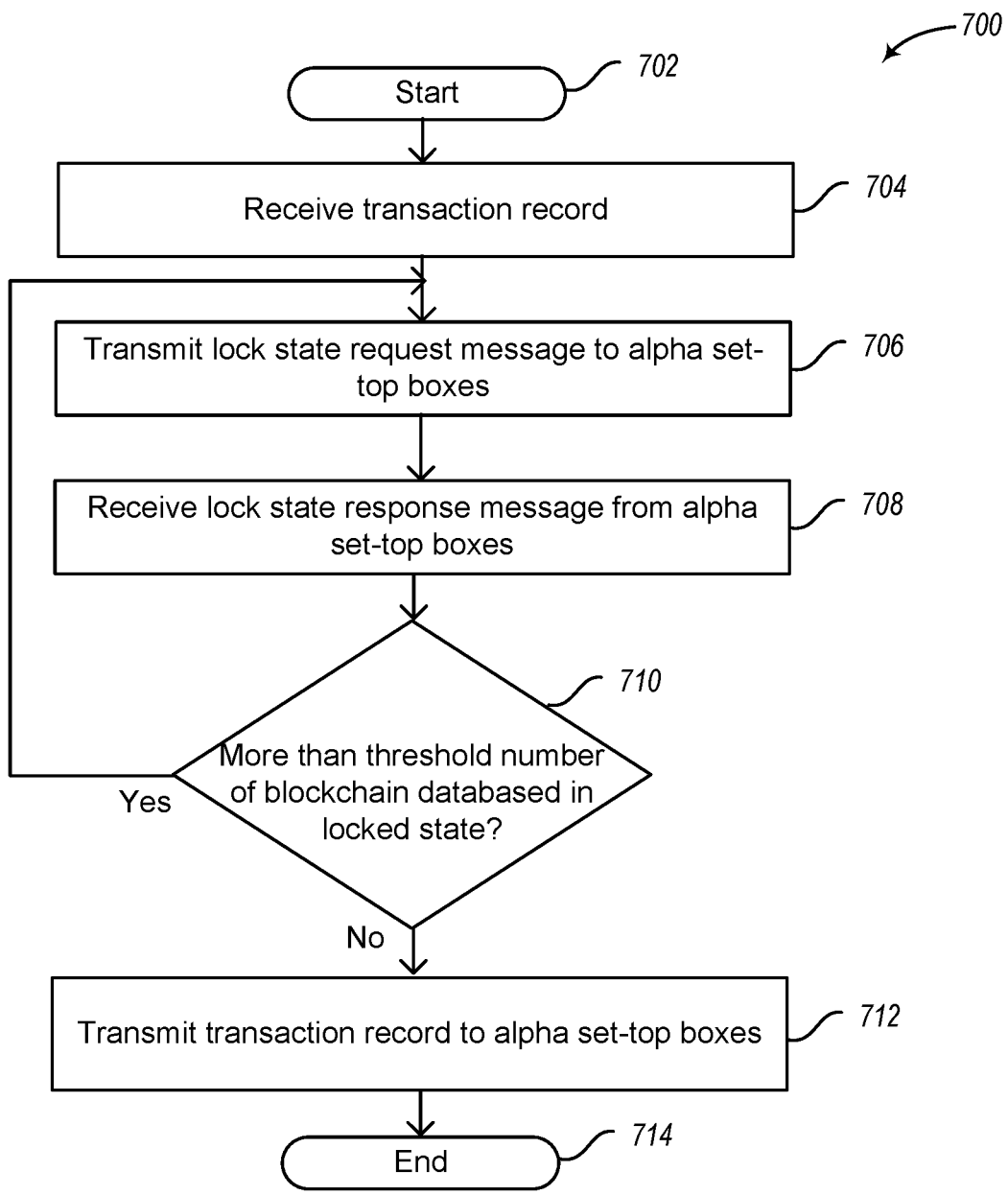
FIG. 7 shows a flowchart of a process performed by the beta set-top boxes, according to one or more embodiments of the present disclosure.

FIG. 7 shows a flowchart of a process 700 performed by each of the beta set-top boxes 106B, according to one or more embodiments of the present disclosure. The process 700 starts at 702.

At 704, a set-top box 106B receives a transaction record from one of the set-top box 106, which transmitted the transaction record at 618, as described above.

At 706, the set-top box 106B transmits a lock state request message to each of the alpha set-top boxes 106A. In one or more embodiments, the set-top box 106B transmits the lock state request message to each address (e.g., IP address) of an alpha set-top box 106A included in a list of addresses that the set-top box 106B received from the head-end computer system 102. Upon receipt of a lock state request message, each alpha set-top box 106A is programmed to reply by transmitting a lock state response message that indicates whether the alpha set-top box 106A is currently in a locked state in which it is writing a block of data to its local blockchain database, or whether the alpha set-top box 106A is currently in an unlocked state in which it is not writing a block of data to its local blockchain database.

At 708, the set-top box 106B receives a lock state response message from each of the alpha set-top boxes 106A to which the set-top box 106B transmitted a lock state request message at 706. In one or embodiments, each lock state response message includes a field having a value that indicates whether the alpha set-top box 106A transmitting the lock state response message has committed to writing a block of data for the set-top box 106B that transmits the lock state request messages at 706.

At 710, the set-top box 106B determines whether more than a threshold number of blockchain databases provided by the alpha set-top boxes 106A, to which the set-top box 106B transmitted a lock state request message at 706, is in the locked state. A value of the threshold number may be provided by the head-end computer system 102. In one more embodiments, the value of the threshold number is selected to be half of the number of alpha set-top boxes 106A to which the set-top box 106B transmitted a lock state request message at 706. The set-top box 106B initializes a variable to zero and increments the variable each time a lock state response message is received at 708 that indicates that an alpha set set-top box 106A is in the locked state. The set-top box 106B then compares the variable to the value of the threshold number. If the variable is greater than the value of the threshold number, the set-top box 106B determines that more than the threshold number of alpha set-top boxes 106A is in the locked state. If not, the set-top box 106B does not determine that more than the threshold number of alpha set-top boxes 106A is in the locked state.

If the set-top box 106B determines at 710 that more than the threshold number of alpha set-top boxes 106A is in the locked state, the process 700 returns to 706, for example, after a predetermined delay period. If the set-top box 106B does not determine at 710 that more than the threshold number of alpha set-top boxes 106A is in the locked state, the process 700 proceeds to 712.

At 712, the set-top box 106B transmits the transaction record to the alpha set-top boxes 106A. More particularly, the set-top box 106B transmits the encrypted transaction record along with the encrypted onetime private key to the alpha set-top boxes 106A. In one or more embodiments, the set-top box 106B transmits the transaction record to each of the alpha set-top boxes 106A to which the set-top box 106B transmitted a lock state request message at 706. In one or more embodiments, the set-top box 106B transmits the transaction record to each of the alpha set-top boxes 106A from which the set-top box 106B has received a lock state response message indicating an unlocked state (or indicating that the alpha set-top box 106A has committed to writing the transaction record) at 708. The process 700 then ends at 714.

Figure 8:
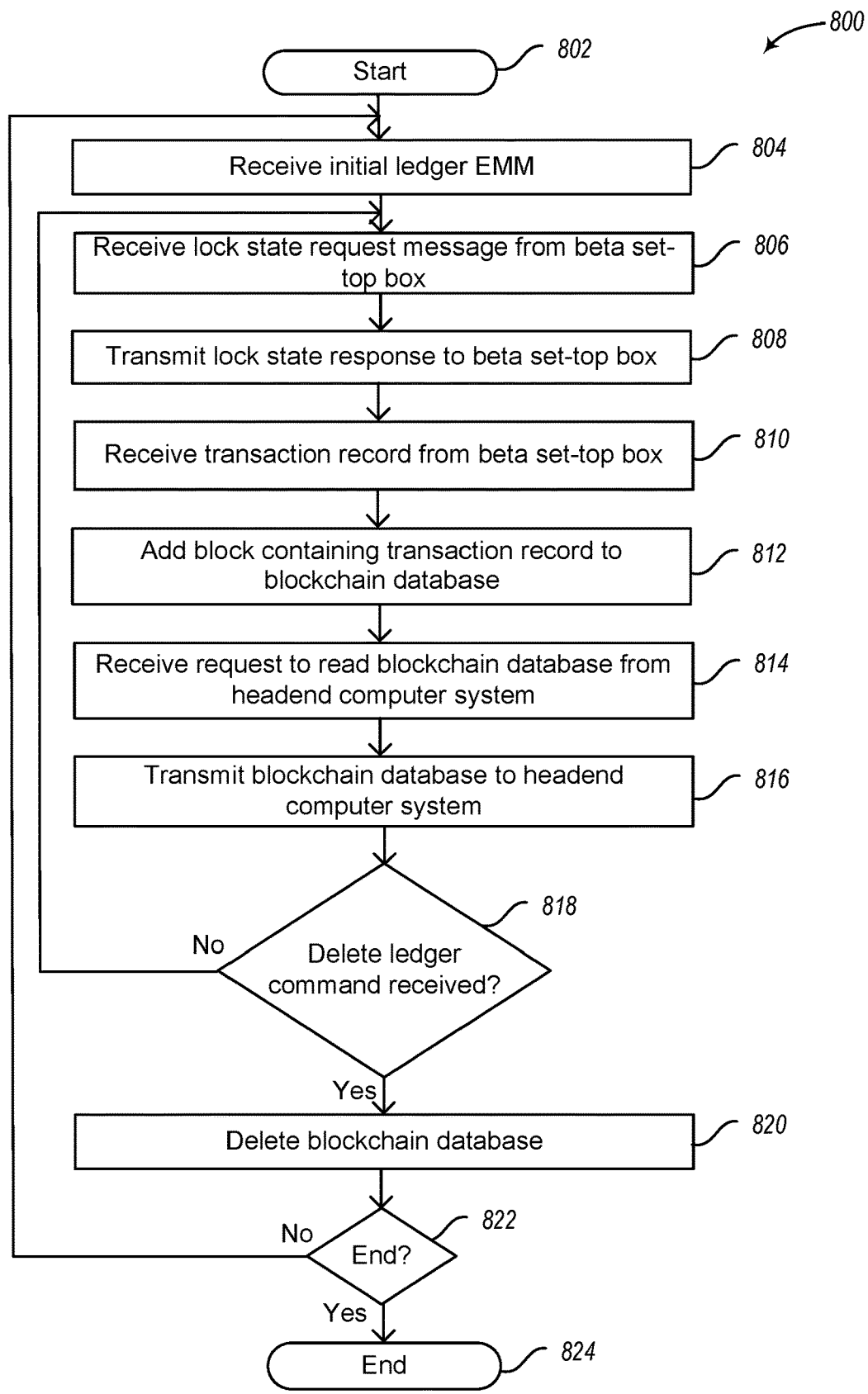
FIG. 8 shows a flowchart of a process performed by the alpha set-top boxes, according to one or more embodiments of the present disclosure.

FIG. 8 shows a flowchart of a process 800 performed by each of the alpha set-top boxes 106A, according to one or more embodiments of the present disclosure. The process 800 begins at 802.

At 804, an alpha set-top box 106A receives an Initial Ledger EMM from the head-end computer system 102. The Initial Ledger EMM includes a generic nonuse transaction record. In response, the alpha set-top box 106A writes the generic nonuse transaction record as a first block of data to its local blockchain database.

At 806, the alpha set-top box 106A receives a lock state request message from a beta set-top box 106B, which transmitted the lock state request message at 706.

At 808, the alpha set-top box 106A transmits a lock state response message to the beta set-top box 106B from which the lock state request message was received at 806. The lock state response message includes a field having a value that indicates whether the alpha set-top box 106A is currently in the locked state. Prior to transmitting the lock state response message, the alpha set-top box 106A determines whether it is currently performing a write operation to its blockchain database, or has committed to do so for another beta set-top box 106B. If the alpha set-top box 106A determines that it is currently performing a write operation to its blockchain database, or has committed to do so for another beta set-top box 106B, the alpha set-top box 106A sets the field to a value indicating the locked state. If the alpha set-top box 106A determines that it is not currently performing a write operation to its blockchain database, and has not committed to do so for another beta set-top box 106B, the alpha set-top box 106A sets the field a value indicating the unlocked state.

At 810, the alpha set-top box 106A receives a transaction record from the beta set-top box 106B to which the alpha set-top box 106A transmitted the lock state response message indicating the unlocked state at 808.

At 812, the alpha set-top box 106A adds or writes the transaction record received at 810 in a block of data to its blockchain database. Each block of data includes header information about the block and the transaction record, including the encrypted version of the onetime private key that was used to encrypt the transaction record. The header information includes at least a first cryptographic hash value that results from applying a secure hash algorithm (e.g., SHA-256) to the transaction record, and a second cryptographic hash value that results from applying a secure hash algorithm (e.g., SHA-256) to the previous block in the ledger. The first cryptographic hash value makes it possible to detect whether the transaction record has been tampered with, as any subsequent change to the transaction record would result in a different hash value. The second cryptographic hash value also makes it possible to detect tampering and enables the blocks to be ordered. The header information of the block may include additional information such as version number, a timestamp value, etc.

At 814, the alpha set-top box 106A receives a request to read its blockchain database from the head-end computer system 102 For example, the alpha set-top box 106A receives the request via the network 108.

At 816, the alpha set-top box 106A transmits a copy of its blockchain database to the head-end computer system 102. For example, the alpha set-top box 106A transmits the blockchain database via the network 108.

At 818, the alpha set-top box 106A determines whether a delete ledger command has been received. For example, the alpha set-top box 106A receives the delete ledger command via the network 108.

At 820, the alpha set-top box 106A determines whether a delete ledger command has been received. For example, the alpha set-top box 106A receives the delete ledger command via the network 108. If the delete ledger command has not been received, the process 800 returns to 806. If the delete ledger command been received, the process 800 proceeds to 822.

At 822, the alpha set-top box 106A determines whether to end the process 800. For example, the alpha set-top box 106A determines whether a control message has been received from the head-end computer system 102 indicating that the process 800 is to end. If the alpha set-top box 106A determines to end the process 800, the process proceeds to 824 and ends. If the alpha set-top box 106A determines not to end the process 800, the process returns to 804.

Figure 5B:
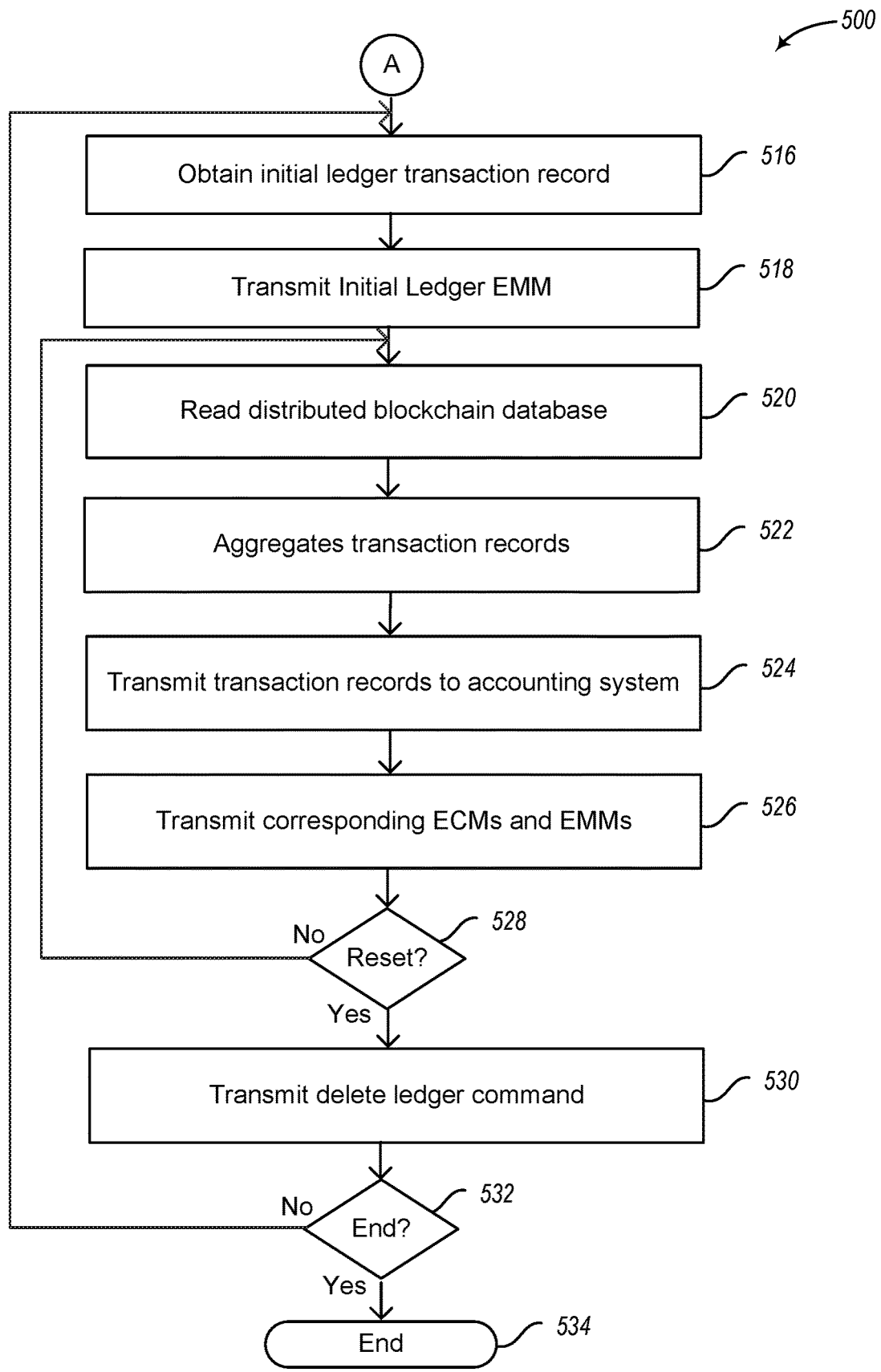

The third phase will now be described with reference to FIG. 5B. During the third phase, the head-end computer system 102 periodically reads the blockchain databases stored by the alpha set-top boxes 106A and processes the ledger data therein so that subscribers are billed and provided with access to content that they have ordered.

At 520, the head-end computer system 102 reads the distributed blockchain data base. More particularly, the head-end computer system 102 sends a read request message to each of the alpha set-top boxes 106A, and then stores the respective blockchain databases returned by the alpha set-top boxes 106A in response to the request messages.

At 522, the head-end computer system 102 aggregates the transaction records stored in the blocks of the various blockchain databases received at 520. For each of the blockchain databases, the head-end computer system 102 computes a cryptographic hash value for the data contained in each block and orders the blocks by referring to the header information. As mentioned previously, the header information of each block includes the second cryptographic has a value, which is the cryptographic has a value of the previous block in the database. If a conflict arises regarding ordering of transaction, the conflict may be resolved using a "longest chain rule", as will be appreciated by those skilled in the art.

As previously mentioned, for each subscriber of the content distribution system 100, the head-end computer system 102 stores a public key (or subkey) that corresponds to a private key, which can be used to decrypt an encrypted onetime private key that is included in a block along with an encrypted transaction record. After the onetime private key has been decrypted, it is used to decrypt the transaction record. After the transaction record is decrypted, the head-end computer system 102 verifies the identity the subscriber and the set-top box 106 associated with the transaction record using the first and second cryptographic hash values included the transaction record, respectively.

For example, the head-end computer system 102 stores a first file or other suitable data structure that includes a unique identifier of each subscriber (e.g. account number) in association with respective cryptographic hash values of the unique identifiers. The head-end computer system 102 compares the first cryptographic hash value included in the header information of a block with the cryptographic hash values in the first file, and if the first cryptographic hash value matches one of the cryptographic hash values in the first file, the head-end computer system 102 determines that a ledger record corresponding to the transaction record includes the unique identifier of the subscriber that is associated in the first file with the matched one of the cryptographic hash values.

In addition, the head-end computer system 102 stores a second file or other suitable data structure that includes a unique identifier of each set-top box 106 (e.g. serial number) in association with its address and the cryptographic hash value of the unique identifier. The head-end computer system 102 compares the second cryptographic hash value included in the header information of a block with the cryptographic hash values in the second file, and if the second cryptographic hash value matches one of the cryptographic hash values in the second file, the head-end computer system 102 determines that the ledger record corresponding to the transaction record includes the unique identifier of the set-top box 106 that is associated in the second file with the matched one of the cryptographic hash values.

If the head-end computer system 102 is not able to decrypt the transaction record, or cannot authenticate the identity of the subscriber and the set-top box 106 associated with the transaction record, the head-end computer system 102 does not further process the transaction record.

The head-end computer system 102 inputs all information derived from authenticated transaction records from all of the blockchain databases into respective records of a master ledger file. Because each transaction record is included in multiple blockchain databases, the head-end computer system 102 either prevents duplicate transaction records from being added to the master ledger file, or subsequently removes duplicate transaction records from the master ledger file.

At 524, the head-end computer system 102 transmits a copy of the master ledger file to the accounting computer system 110. The head-end computer system 102 may encrypt the copy of the master ledger file prior to transmitting it to the accounting computer system 110.

At 526, the head-end computer system 102 transmits ECMs and EMMs to the set-top boxes 106 identified in the transaction records using an address obtained from the second file, which enable those set-top boxes 106 to output content that has been ordered to an end user. The head-end computer system 102 may wait to transmit the ECMs and EMMs at 526 until after the accounting computer system 110 has acknowledged receipt of the master ledger file transmitted at 524, to ensure that subscriber accounts will be billed for the content that has been ordered.

At 526, the head-end computer system 102 determines whether the blockchain databases stored by the alpha set-top boxes 106A are to be reset. For example, the head-end computer system 102 determines whether a predetermined period of time has elapsed since the Initial Ledger EMM was last transmitted at 518. Additionally or alternatively, the head-end computer system 102 may determine whether the blockchain databases stored by the alpha set-top boxes 106A are to be deleted based on the size of one or more of the blockchain databases read at 520. In other words, the head-end computer system 102 may determine that the blockchain databases stored by the alpha set-top boxes 106A are to be reset because they are taking up too much storage space the alpha set-top boxes 106A.

If the head-end computer system 102 determines that the blockchain databases stored by the alpha set-top boxes 106A are not to be reset, the process 500 returns to 520. If the head-end computer system 102 determines that the blockchain databases stored by the alpha set-top boxes 106A are to be reset, the process 500 proceeds to 530.

At 530, the head-end computer system 102 transmits a delete ledger command to the alpha set-top boxes 106A. In one or more embodiments, the head-end computer system 102 transmits the delete ledger command to the alpha set-top boxes 106A in an EMM via the satellite 104. In one or more embodiments, the head-end computer system 102 transmits the delete ledger command to the alpha set-top boxes 106A via the network 108.

At 532, the head-end computer 102 determines whether to end the process 500. For example, the head-end computer 102 determines whether a predetermined input has been received in response to a user selecting an icon that is displayed on the monitor 156. If the head-end computer system 102 determines not to end the process 500, the process 500 returns to 520. If the head-end computer system 102 determines to end the process 500, the process 500 proceeds to 534 and ends.

The various embodiments described above can be combined to provide further embodiments. For example, to reduce the processing loads on the alpha set-top boxes 106A and/or the beta set-top boxes 1066, a regional approach may be used. According to the regional approach, a regional cache database, which is similar to the database of the accounting computer system 110 that stores subscriber public key certificates and transaction records, is provided in each of a plurality of regions and stores transaction records that ordinate in that region. The head-end computer 102 can transmit message JavaScript Object Notation (JSON) formatted messages with pre-emptive scaling data and times to obtain data that is stored in the regional cache databases. In addition, the set-top boxes 106 may contact the accounting computer system 110 to recall purchases.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A content distribution method comprising:
 transmitting, by content distribution system, a first record;
 receiving, by a first set-top box, the first record from the content distribution system;
 storing, by the first set-top box, the first record in a first block of data of a first blockchain database;
 encrypting, by a second set-top box, a second record that includes a cryptographic hash value that identifies the second set-top box and an identifier of a first content item;
 after the encrypting, transmitting, by the second set-top box, the second record:
 receiving, by a third set-top box, the second record from the second set-top box;
 transmitting, by the third set-top box, the second record;
 receiving, by the first set-top box, the second record from the third set-top box:
 obtaining, by the first set-top box, a cryptographic hash value using the first record;
 storing, by the first set-top box, the second record in a second block of data of the first blockchain database, the second block of data including the cryptographic hash value obtained by the first set-top box using the first record;
 receiving, by the content distribution system, the first blockchain database from the first set-top box;
 obtaining, by the content distribution system, a cryptographic hash value using the first record;
 comparing, by the content distribution system, the cryptographic hash value obtained by the content distribution system using the first record to the cryptographic hash value included in the second block of first blockchain database;
 after determining, based on the comparing of the cryptographic hash value obtained by the content distribution system using the first record to the cryptographic hash value included in the second block of first blockchain database, that the cryptographic hash value obtained by the content distribution system using the first record matches the cryptographic hash value included in the second block of first blockchain database:
  decrypting, by the content distribution system, the second record;
  obtaining, by the content distribution system, an address of the second set-top box using the cryptographic hash value included in the second record; and
  transmitting, by the content distribution system, a first message to the second set-top box, the first message including information that enables the second set-top box to descramble a signal that is based on the first content item identified in the second record, using the address of the second set-top box obtained using the cryptographic hash value included in the second record.

2. The content distribution method of claim 1, further comprising:
 transmitting, by the content distribution system, a second message; and
 receiving, by the first set-top box, the second message from the content distribution system; and
 in response to receiving the second message, deleting, by the first set-top box, the first blockchain database.

3. The content distribution method of claim 1, further comprising:
 receiving, by a fourth set-top box, the first record from the content distribution system;
 storing, by the fourth set-top box, the first record in a first block of data of a second blockchain database;
 receiving, by the fourth set-top box, the second record that includes the cryptographic hash value that identifies the second set-top box and the identifier of the first content item from the third set-top box;
 obtaining, by the fourth set-top box, a cryptographic hash value using the first record;
 storing, by the fourth set-top box, the second record in a second block of data of the second blockchain database, the second block of data including the cryptographic hash value obtained by the fourth set-top box using the first record;
 receiving, by the content distribution system, the second blockchain database from the fourth set-top box;
 comparing, by the content distribution system, the cryptographic hash value obtained by the content distribution system using the first record to the cryptographic hash value included in the second block of second blockchain database.

4. The content distribution method of claim 1, further comprising:
 receiving, by a fourth set-top box, the first record from the content distribution system;
 storing, by the fourth set-top box, the first record in a first block of data of a second blockchain database;
 encrypting, by a fifth set-top box, a third record that includes a cryptographic hash value that identifies the fifth set-top box and an identifier of a second content item;
 transmitting, by the fifth set-top box, the third record;
 receiving, by a sixth set-top box, the third record from the fifth set-top box;
 transmitting, by the sixth set-top box, the third record;
 receiving, by the fourth set-top box, the third record from the sixth set-top box:
 obtaining, by the fourth set-top box, a cryptographic hash value using the first record;
 storing, by the fourth set-top box, the second record in a second block of data of the second blockchain database, the second block of data including the cryptographic hash value obtained by the fourth set-top box using the first record;
 receiving, by the content distribution system, the second blockchain database from the fourth set-top box;
 comparing, by the content distribution system, the cryptographic hash value obtained by the content distribution system using the first record to the cryptographic hash value included in the second block of second blockchain database;
 after determining, based on the comparing of the cryptographic hash value obtained by the content distribution system using the first record to the cryptographic hash value included in the second block of second blockchain database, that the cryptographic hash value obtained by the content distribution system using the first record matches the cryptographic hash value included in the second block of second blockchain database:
- decrypting, by the content distribution system, the third record;
- obtaining, by the content distribution system, an address of the fifth set-top box using the cryptographic hash value included in the third record; and
- transmitting, by the content distribution system, a second message to the fifth set-top box, the second message including information that enables the fifth set-top box to descramble a signal that is based on the second content item identified in the third record, using the address of the fifth set-top box obtained using the cryptographic hash value included in the third record.

5. The content distribution method of claim 1 wherein the second record includes a cryptographic hash value that identifies a user of the second set-top box, the method further comprising:
- obtaining, by the content distribution system, an identifier of the user of the second set-top box using the cryptographic hash value that identifies the user of the second set-top box included in the second record;
- obtaining, by the content distribution system, an identifier of the second set-top box using the cryptographic hash value that identifies the second set-top box included in the second record; and
- storing, by the content distribution system, a third record that includes the identifier of the user of the second set-top box, the identifier of the second set-top box, and the identifier of the first content item.

6. The content distribution method of claim 1, further comprising:
- in response to the receiving, by the third set-top box, of the second record, transmitting a second message to the second set-top box;
- receiving, by the second set-top box, the second message from the third set-top box;
- in response to the receiving of the second message, transmitting, by the second set-top box, a third message including a value indicating a state of the first blockchain database; and
- receiving, by the third set-top box, the third message,
wherein the transmitting, by the third set-top box, of the second record is in response to the receiving, by the third set-top box, of the third message.

7. The content distribution method of claim 6, further comprising:
- transmitting, by the third set-top box, a fourth message to a fourth set-top box that provides a second blockchain database;
- transmitting, by the third set-top box, a fifth message to a fifth set-top box that provides a third blockchain database;
- receiving, by the third set-top box, a sixth message including a value indicating a state of the second blockchain database from the fourth set-top box;
- receiving, by the third set-top box, a seventh message including a value indicating a state of the third first blockchain database from the fifth set-top box;
- determining, by the third set-top box, whether more than a threshold number of the first blockchain database, second blockchain database, and third blockchain database are not in a locked state based on the third, sixth, and seventh messages;
- in response to determining that more than the threshold number of the first blockchain database, second blockchain database, and third blockchain database are not in the locked state:
  - transmitting, by the third set-top box, the second record to the fourth set-top box; and
  - transmitting, by the third set-top box, the second record to the fifth set-top box,
wherein the transmitting, by the third set-top box, of the second record to the first set-top box is in response to determining that more than the threshold number of the first blockchain database, second blockchain database, and third blockchain database are not in the locked state.

8. The content distribution method of claim 6, further comprising:
- receiving, by the second set-top box, a request for the first content item;
- in response to the receiving, by the second set-top box, of the request for the first content item:
  - obtaining, by the second set-top box, a cryptographic hash value that identifies a user of the second set-top box;
  - obtaining, by the second set-top box, the cryptographic hash value that identifies the second set-top box;
  - obtaining, by the second set-top box, the identifier of the second content item; and
  - generating, by the second set-top box, the second record, the second record including the cryptographic hash value that identifies the user of the second set-top box, the cryptographic hash value that identifies the second set-top box, and the identifier of the second content item.

9. The content distribution method of claim 1, further comprising:
- receiving, by the second set-top box, the first message including the information that enables the second set-top box to descramble the signal that is based on the first content item from the content distribution system;
- descrambling, by the second set-top box, the signal that is based on the first content item; and
- outputting, by the second set-top box, a video signal including the first content item.

10. A content distribution system comprising:
- a computer system including:
  - at least one first processor; and
  - at least one first memory device storing at least one first program that, when executed by the at least one first processor, causes the computer system to transmit a first record; and
- a first set-top box including:
  - at least one second processor; and
  - at least one second memory device storing at least one second program;
- a second set-top box including:
  - at least one third processor; and
  - at least one third memory device storing at least one third program that, when executed by the at least one third processor, causes the second set-top box to:
    - encrypt a second record that includes a cryptographic hash value that identifies the second set-top box and an identifier of a first content item; and
    - after the second record is encrypted, transmit the second record; and a third set-top box including:
  at least one fourth processor; and
  at least one fourth memory device storing at least one fourth program that, when executed by the at least one fourth processor, causes the third set-top box to:
    receive the second record from the second set-top box; and
    transmit the second record;
wherein the at least one second program, when executed by the at least one second processor, causes the first set-top box to:
  receive the first record from the computer system;
  store the first record in a first block of data of a first blockchain database;
  receive the second record from the third set-top box;
  obtain a cryptographic hash value using the first record; and
  store the second record in a second block of data of the first blockchain database, the second block of data including the cryptographic hash value obtained by the first set-top box using the first record,
wherein the at least one program stored by the at least one first memory device, when executed by the at least one first processor, causes the computer system to:
  receive the first blockchain database from the first set-top box;
  obtain a cryptographic hash value using the first record;
  compare the cryptographic hash value obtained by the computer system using the first record to the cryptographic hash value included in the second block of first blockchain database;
  after the cryptographic hash value obtained using the first record is compared to the cryptographic hash value included in the second block of first blockchain database, determine that the cryptographic hash value obtained using the first record matches the cryptographic hash value included in the second block of first blockchain database;
  in response to determining that the cryptographic hash value obtained using the first record matches the cryptographic hash value included in the second block of first blockchain database:
    decrypt the second record;
    obtain an address of the second set-top box using the cryptographic hash value included in the second record; and
    transmit a first message to the second set-top box, the first message including information that enables the second set-top box to descramble a signal that is based on the first content item identified in the second record, using the address of the second set-top box obtained using the cryptographic hash value included in the second record.

11. The content distribution system of claim 10, further comprising:
  wherein the at least one first program stored by the at least one first memory device, when executed by the at least one first processor, causes the computer system to transmit a second message; and
  wherein the at least one second program stored by the at least one second memory device, when executed by the at least one second processor, causes the first set-top box to:
    receive the second message from the content distribution system; and
    in response to receiving the second message, delete the first blockchain database.

12. The content distribution system of claim 10, further comprising:
  fourth set-top box including:
    at least one fifth processor; and
    at least one fifth memory device storing at least one fifth program that, when executed by the at least one fifth processor, causes the fourth set-top box to:
      receive the first record from the content distribution system;
      store the first record in a first block of data of a second blockchain database;
      receive the second record that includes the cryptographic hash value that identifies the second set-top box and the identifier of the first content item from the third set-top box;
      obtain a cryptographic hash value using the first record; and
      store the second record in a second block of data of the second blockchain database, the second block of data including the cryptographic hash value obtained using the first record,
  wherein the at least one first program stored by the at least one first memory device, when executed by the at least one first processor, causes the computer system to:
    receive the second blockchain database from the first set-top box; and
    compare the cryptographic hash value obtained using the first record to the cryptographic hash value included in the second block of second blockchain database.

13. The content distribution system of claim 10, further comprising:
  fourth set-top box including:
    at least one fifth processor; and
    at least one fifth memory device storing at least one fifth program;
  a fifth set-top box including:
    at least one sixth processor; and
    at least one sixth memory device storing at least one sixth program that, when executed by the at least one sixth processor, causes the fifth set-top box to:
      encrypt a third record that includes a cryptographic hash value that identifies the fifth set-top box and an identifier of a second content item; and
      transmit the third record; and
  a sixth set-top box including:
    at least one seventh processor; and
    at least one seventh memory device storing at least one seventh program that, when executed by the at least one seventh processor, causes the sixth set-top box to:
      receive the third record from the fifth set-top box; and
      transmit the third record,
  wherein the at least one fifth program, when executed by the at least one fifth processor, causes the fourth set-top box to:
    receive the first record from the computer system;
    store the first record in a first block of data of a second blockchain database;
    receive the third record from the sixth set-top box;
    obtain a cryptographic hash value using the first record; and store the second record in a second block of data of the second blockchain database, the second block of data including the cryptographic hash value obtained using the first record, wherein the at least one first program stored by the at least one first memory device, when executed by the at least one first processor, causes the computer system to:

receive the second blockchain database from the fourth set-top box;

compare the cryptographic hash value obtained using the first record to the cryptographic hash value included in the second block of second blockchain database;

after the cryptographic hash value obtained using the first record is compared to the cryptographic hash value included in the second block of second blockchain database, determine that the cryptographic hash value obtained using the first record matches the cryptographic hash value included in the second block of second blockchain database;

in response to determining that the cryptographic hash value obtained using the first record matches the cryptographic hash value included in the second block of second blockchain database:

decrypt the third record;

obtain an address of the fifth set-top box using the cryptographic hash value included in the third record; and transmit a second message to the fifth set-top box, the second message including information that enables the fifth set-top box to descramble a signal that is based on the second content item identified in the third record, using the address of the fifth set-top box obtained using the cryptographic hash value included in the third record.

14. The content distribution system of claim 10 wherein the second record includes a cryptographic hash value that identifies a user of the second set-top box, and wherein the at least one first program stored by the at least one first memory device, when executed by the at least one first processor, causes the computer system to:

obtain an identifier of the user of the second set-top box using the cryptographic hash value that identifies the user of the second set-top box included in the second record;

obtain an identifier of the second set-top box using the cryptographic hash value that identifies the second set-top box included in the second record; and store a third record that includes the identifier of the user of the second set-top box, the identifier of the second set-top box, and the identifier of the first content item.

15. The content distribution system of claim 10 wherein the at least one fourth program stored by the at least one fourth memory device, when executed by the at least one fourth processor, causes the third set-top box to:

in response to receiving the second record from the second set-top box, transmit a second message to the first content receiver; and receive a third message including a value indicating a state of the first blockchain database from the first set-top box, the third message being transmitted by the first set-top box in response to receiving the second message from the third set-top box, wherein the at least one fourth program, when executed by the at least one fourth processor, causes the third set-top box to transmit the second record in response to receiving the third message including the value indicating the state of the first blockchain database from the first set-top box.

16. The content distribution system of claim 15 wherein the at least one fourth program stored by the at least one fourth memory device, when executed by the at least one fourth processor, causes the third set-top box to:

transmit a fourth message to a fourth set-top box that provides a second blockchain database;

transmit a fifth message to a fifth set-top box that provides a third blockchain database;

receive a sixth message including a value indicating a state of the second blockchain database from the fourth set-top box;

receive a seventh message including a value indicating a state of the third first blockchain database from the fifth set-top box;

determine whether more than a threshold number of the first blockchain database, second blockchain database, and third blockchain database are not in a locked state based on the third, sixth, and seventh messages;

in response to determining that more than the threshold number of the first blockchain database, second blockchain database, and third blockchain database are not in the locked state:

transmit the second record to the fourth set-top box; and transmit the second record to the fifth set-top box, wherein the at least one fourth program, when executed by the at least one fourth processor, causes the third set-top box to transmit the second record to the first set-top box in response to determining that more than the threshold number of the first blockchain database, second blockchain database, and third blockchain database are not in the locked state.

17. The content distribution system of claim 15 wherein the at least one third program, when executed by the at least one third processor, causes the second set-top box to:

receive a request for the first content item;

in response to receiving the request for the first content item:

obtain a cryptographic hash value that identifies a user of the second set-top box;

obtain the cryptographic hash value that identifies the second set-top box;

obtain the identifier of the second content item; and generate the second record.

18. The content distribution system of claim 10 wherein the at least one third program stored in the at least one third memory device, when executed by the at least one third processor, causes the second set-top box to:

receive the first message including the information that enables the second set-top box to descramble the signal that is based on the first content item;

descramble the signal that is based on the first content item; and output a video signal including the first content item.

* * * * *